(12) United States Patent
Iikawa et al.

(10) Patent No.: US 6,747,807 B2
(45) Date of Patent: Jun. 8, 2004

(54) LENS BARREL

(75) Inventors: Makoto Iikawa, Saitama (JP); Takuji Hamasaki, Saitama (JP)

(73) Assignee: PENTAX Corporation, Tokyo (JP)

( * ) Notice: Subject to any disclaimer, the term of this patent is extended or adjusted under 35 U.S.C. 154(b) by 136 days.

(21) Appl. No.: 10/066,703

(22) Filed: Feb. 6, 2002

(65) Prior Publication Data

US 2002/0105731 A1 Aug. 8, 2002

(30) Foreign Application Priority Data

| Feb. 8, 2001 | (JP) | ................................ 2001-032056 |
| Feb. 8, 2001 | (JP) | ................................ 2001-032057 |
| Feb. 8, 2001 | (JP) | ................................ 2001-032058 |
| Feb. 8, 2001 | (JP) | ................................ 2001-032059 |

(51) Int. Cl.[7] .......................... G02B 15/14; G03B 17/00
(52) U.S. Cl. .................. 359/694; 359/695; 359/700; 359/701; 396/72; 396/79
(58) Field of Search ............................... 359/694, 695, 359/696, 699, 700, 701, 823; 396/72, 79

(56) References Cited

U.S. PATENT DOCUMENTS 5,589,987 A * 12/1996 Tanaka ..................... 359/701
6,333,825 B1   12/2001 Hamasaki et al. ......... 359/699

* cited by examiner

*Primary Examiner*—Loha Ben
(74) *Attorney, Agent, or Firm*—Greenblum & Bernstein P.L.C.

(57) ABSTRACT

A lens barrel includes a stationary barrel, first through third lens support rings, and a lens drive ring including a first guide engaged with a guide formed on the stationary barrel; an engaging portion engaged with a guide formed on the first lens support ring, the lens drive ring and the first lens support ring being relatively rotatable and integrally movable in the optical axis direction; a second guide, engaged with a guide formed on the second lens support ring, to move the second lens support ring in the optical axis direction relative to the lens drive ring via rotation of the lens drive ring; and a third guide engaged with a guide formed on the third lens support ring to move the third lens support ring in the optical axis direction relative to the lens drive ring via rotation of the lens drive ring.

48 Claims, 15 Drawing Sheets

LENS BARREL

BACKGROUND OF THE INVENTION

1. Field of the Invention

The present invention relates to a lens barrel which can be used as an interchangeable lens for SLR cameras.

2. Description of the Related Art

In a lens barrel in which two or more lens groups move in an optical axis direction, it is generally the case that a rotation of a rotating ring causes lens support rings, which respectively support the lens groups, to move in the optical axis direction. For instance, a lens drive mechanism having a structure wherein a set of cam grooves or lead grooves (hereinafter referred to as "a set of extending guide grooves") are formed on an inner peripheral surface of a rotating ring and a set of follower pins formed on a linearly-guided lens support ring are respectively engaged in the extending guide grooves, is known in the art. However, since there is a maximum length to such a rotating ring to keep the lens barrel compact, the number of lens support rings that the single rotating ring can guide directly is a maximum of two in conventional lens barrels. If it is desired to guide more than two lens support rings, it has been conventional practice to provide an additional rotating ring, which increases the number of elements of the lens barrel and complicates the internal structure thereof. This generally increases the size of the lens barrel and also the cost of production; moreover, the increase of the number of elements of the lens barrel and the complicated structure thereof tend to become the cause of backlash and play, which deteriorate the accuracy in position of lens elements of the zoom lens. Accordingly, it is desirable to develop a compact and low-cost lens drive mechanism for moving more than two lens groups in the optical axis direction while ensuring a sufficient degree of accuracy in position of the lens groups in a lens barrel.

A typical extending guide mechanism using a rotating ring in a conventional lens barrel has a structure such that a linear guide ring is positioned inside the rotating ring and a lens support ring is positioned inside the linear guide ring. The rotating ring is provided on an inner peripheral surface thereof with the aforementioned set of extending guide grooves, and the linear guide ring is provided with a set of radial through slots for guiding the lens support ring linearly in the optical axis direction. The lens support ring is provided, along a circumference thereof at the same positions on the lens support ring, with a set of linear guide projections and a set of follower pins, so that the set of linear guide projections are respectively engaged in the radial through slots of the linear guide ring and so that the set of follower pins respectively pass through the set of radial through slots of the linear guide ring to be engaged in the set of extending guide grooves of the rotating ring. With this structure, a rotation of the rotating ring causes the lens support ring, which is guided linearly in the optical axis direction without rotating about the optical axis, to move in the optical axis direction along the set of radial through slots of the linear guide ring due to the engagement of the set of extending guide grooves of the rotating ring with the set of follower pins of the lens support ring.

If it is desired to increase in performance of a lens barrel, it is preferable that no radial holes or slots be provided on any components of the lens barrel. Namely, if radial through slots serving as linear guide slots such as those described above are formed on a ring member, the radial through slots have an adverse effect on the accuracy in dimensions of the ring member when the ring member is molded, which may cause one or more lens groups that are supported by the molded ring member to tilt and/or decenter, and/or to deviate in the optical axis direction. A solution to this problem is to make each fundamental component of the lens barrel, such as the aforementioned ring member, out of metal. However, this generally increases the cost of production. To make matters worse, if such radial through slots are formed, harmful rays and foreign particles enter inside the lens barrel through the radial through slots to thereby deteriorate the optical performance.

If the rotating ring on which the extending guide grooves are formed is molded of synthetic resin, each extending guide groove is generally formed to have a tapered cross section so that an associated mold can be easily removed, and so that each extending guide groove generally has a trapezoidal cross section. In this case, each of the two opposite surfaces of each extending guide groove which guide the associated follower pin along the groove is inclined with respect to the axial direction of the follower pin. Therefore, each follower pin cannot be easily positioned to the corresponding extending guide groove with precision. This may cause backlash and play in the optical axis direction and/or radial directions, and may cause harmful rays and foreign particles to pass through the engaging portions between the extending guide grooves and the follower pins. A solution to this problem is to make the rotating ring out of metal, not synthetic resin, to achieve a high degree of accuracy. Another solution is to improve the shape and the structure of the follower pins. However, these solutions are generally costly. In addition, the follower pins are formerly provided as independent elements separate from the lens support ring; the follower pins are fixed to the lens support ring after the lens support ring has been molded. This structure is a leading cause of an increase in the cost of production.

In the case of having two lens groups move relative to each other in the optical axis direction with the use of the above described rotating ring, usually the amount of relative movement between the two lens groups cannot be greater than the length of the rotating ring in conventional zoom lenses. When a greater amount of relative movement between the two lens groups is necessary, it is often necessary to increase the number of movable barrels by providing, e.g., another rotating ring. However, this increases the size of the lens barrel, makes it difficult to insure accuracy of some of the components of the lens barrel, and increases the cost of production, and accordingly, is unpreferable. Conventionally, when two lens groups are made to move relative to each other in the optical axis direction, the linear guide mechanism for guiding each movable lens group in the optical axis and also the driving force transfer mechanism for transferring rotation from one rotating ring another rotating ring tend to become complicated, so that such a mechanism has been desired to be simplified.

A lens barrel which is provided with a hand-operated ring which is turned to move the whole zoom lens optical system or a focusing lens group in the optical axis direction, and an additional electric drive mechanism for driving the zoom lens optical system or the focusing lens group in the optical axis direction is known in the art. In this advanced type of lens barrel, the hand-operated ring is engaged with a lens support member in a manner such that rotation of the hand-operated ring can be transferred to the lens support member, while the lens barrel is also provided with a drive gear which receives a driving force from the electric drive mechanism. Conventionally, the driving force received by the drive gear is transferred to the lens support member via the hand-operated ring. More specifically, the hand-operated ring is provided with a gear portion, and a relay gear (or a relay gear train) is positioned so that one end and the other end of the relay gear are respectively engaged with this gear portion and the drive gear. The space for the relay gear and the gear portion formed on the hand-operated ring interfere with inner moving parts of the lens barrel to therefore limit the range of movement thereof, and become leading causes to the increase in size of the lens barrel. For instance, the relay gear is preferably made of synthetic resin to reduce the cost of production. However, the relay gear has to be made large to ensure a sufficient strength of the relay gear if made of synthetic resin, thus requiring a large space for the relay gear in the lens barrel.

SUMMARY OF THE INVENTION

The present invention provides a lens barrel having more than two movable lens groups, wherein simplification, further miniaturization, cost-reduction, and improvement in precision of the mechanism are all achieved in the lens barrel.

A lens barrel is provided, having at least two movable lens groups which are movable relative to each other, wherein the accuracy in position of these lens groups and the optical performance thereof are improved without a substantial increase in the cost of production.

A compact lens barrel is provided, having two lens groups which are movable relative to each other, wherein a great amount of relative movement between the two lens groups is realized.

A lens barrel provided with both a hand-operated ring for manually driving one or more movable lens groups and an electric lens driving mechanism for driving the same movable lens group or groups, is provided, wherein a lens driving force transfer system associated with the hand-operated ring and the electric lens driving mechanism is designed compact to downsize the lens barrel.

For example, in an embodiment, a lens barrel is provided, including a stationary barrel; first, second, and third lens support rings which are guided in a direction of an optical axis via the stationary barrel; and a lens drive ring which is rotated about the optical axis to move each of the first lens support ring, the second lens support ring and the third lens support ring in the optical axis direction. The lens drive ring includes a first extending guide portion which is engaged with a fixed extending guide portion formed on the stationary barrel to move the lens drive ring in the optical axis direction upon the lens drive ring being rotated; an engaging portion which is engaged with a guiding portion formed on the first lens support ring, so that the lens drive ring and the first lens support ring are relatively rotatable about the optical axis and integrally movable in the optical axis direction; a second extending guide portion, which is engaged with an extending guide portion formed on the second lens support ring, to move the second lens support ring in the optical axis direction relative to the lens drive ring via rotation of the lens drive ring; and a third extending guide portion which is engaged with an extending guide portion formed on the third lens support ring to move the third lens support ring in the optical axis direction relative to the lens drive ring by the rotation of the lens drive ring.

It is desirable for the lens drive ring to be molded with synthetic resin, wherein the engaging portion of the lens drive ring, the first extending guide portion, the second extending guide portion, and the third extending guide portion, are formed integral with the lens drive ring.

In an embodiment, the engaging portion of the lens drive ring, the first extending guide portion, the second extending guide portion, and the third extending guide portion are all formed as projections that project from the lens drive ring.

In an embodiment, the second extending guide portion and the third extending guide portion are formed on one and the other of inner and outer peripheral surfaces of the lens drive ring, respectively.

In an embodiment, the lens drive ring includes a rotational transfer recess to receive a driving force by which the lens drive ring rotates.

In an embodiment, the stationary barrel includes a linear guide portion for guiding one of the first lens support ring, and the second and third lens support rings in the optical axis direction; and wherein the first lens support ring includes linear guide portion for guiding the other of the first lens support ring, and the second and third lens support rings in the optical axis direction.

In an embodiment, the lens barrel further includes a rotating ring supported by one of the second lens support ring and the third lens support ring to be rotatable about the optical axis; and a fourth lens support ring which is guided in the optical axis direction without rotating about the optical axis, the fourth lens support ring being moved in the optical axis direction via rotation of the rotating ring. The lens drive ring includes a lever via which the rotation of the lens drive ring is transferred to the rotating ring.

In another embodiment, a lens barrel having a first lens group and a second lens group which are movable in a direction of an optical axis relative to each other, are provided, the lens barrel including a first lens support ring which supports the first lens group; a rotating ring which is supported by the first lens support ring to be rotatable about the optical axis, wherein the rotating ring is rotated about the optical axis; a second lens support ring which holds the second lens group, and is positioned between an inner peripheral surface of the rotating ring and an outer peripheral surface of the first lens support ring; a linear guide bottomed groove formed on one of an outer peripheral surface of the first lens support ring and an inner peripheral surface of the second lens support ring to extend parallel to the optical axis; a linear guide projection formed on the other of the outer peripheral surface of the first lens support ring and the inner peripheral surface of the second lens support ring to be slidably engaged in the linear guide bottomed groove; a extending guide protrusion formed on one of an inner peripheral surface of the rotating ring and an outer peripheral surface of the second lens support ring; and a follower pin formed on the other of the inner peripheral surface of the rotating ring and the outer peripheral surface of the second lens support ring, the follower pin engaging with the extending guide protrusion. Each of the first lens support ring, the second lens support ring, and the rotating ring is formed as a solid annular member having no radial through holes.

In an embodiment, the extending guide protrusion has a rectangular shape in cross section. The follower pin includes at least one pair of cylindrical follower pins, each the pair of cylindrical follower pins holding a corresponding the extending guide protrusion therebetween.

In an embodiment, the follower pin comes into linear contact with the extending guide protrusion along a line extending substantially in a radial direction of the lens barrel.

In an embodiment, each the extending guide protrusion includes a non-linear contour.

In an embodiment, each of the first lens support ring, the second lens support ring, and the rotating ring is molded with synthetic resin.

In an embodiment, the extending guide protrusion is formed integral with one of the rotating ring and the second lens support ring, and wherein the follower pin is formed on the other of the rotating ring and the second lens support ring.

In an embodiment, the linear guide projection is formed integral with one of the first lens support ring and the second lens support ring.

In an embodiment, one of the first lens support ring and the rotating ring includes a circumferential bottomed groove which extends circumferentially, wherein the other of the first lens support ring and the rotating ring includes a guide projection which is engaged in the circumferential bottomed groove. The first lens support ring and the rotating ring are coupled to each other to be rotatable relative to each other due to an engagement of the guide projection with the circumferential bottomed groove.

In an embodiment, each of the first lens group and the second lens group serves a lens group of a zoom lens system.

In an embodiment, the lens barrel further includes a third lens group which differs from the first and second lens groups; a zoom ring which can be manually rotated; a cam ring which is rotated by rotation of the zoom ring to move the third lens group in the optical axis direction; and a rotational transfer arm which extends from the rotating ring and is engaged with the cam ring to receive a rotational force from the cam ring. A rotation of the zoom ring causes the first rotating ring to rotate to thereby move the first lens group and second lens group in the optical axis direction relative to each other.

In another embodiment, a lens barrel having a first lens group and a second lens group which are relatively movable in a direction of the optical axis thereof, are provided, the lens barrel including a stationary barrel; a drive ring which is supported by the stationary barrel to move in the optical axis direction while rotating about the optical axis relative to the stationary barrel upon being rotated; a first movable ring which supports the first lens group and is guided along the optical axis, the first movable ring being supported by the drive ring so that the drive ring is rotatable about the optical axis and integrally movable with the first movable ring in the optical axis direction; and a second movable ring which supports the second lens group and is guided in the optical axis direction without rotating about the optical axis, a rotation of the drive ring relative to the second movable ring causing the second movable ring to move in the optical axis direction relative to the drive ring. The first movable ring moves together with the drive ring in the optical axis direction, and at the same time, the second movable ring concurrently moves in the optical axis direction relative to the drive ring when the drive ring moves in the optical axis direction while rotating about the optical axis.

In an embodiment, the first movable ring includes a linear moving ring which is guided in the optical axis direction without rotating about the optical axis, the linear moving ring being supported by the drive ring so as to be relatively rotatable with respect to the drive ring about the optical axis, and to be integrally movable with the drive ring in the optical axis direction; and a lens support ring which supports the first lens group, and is positioned in the linear moving ring to be supported thereby so that the lens support ring can be moved in the optical axis direction with respect to the linear moving ring while rotating about the optical axis relative to the linear moving ring. When the linear moving ring is moved forward and rearward in the optical axis direction, the lens support ring integrally moves forward and rearward together with the linear moving ring in the optical axis direction. When the lens support is individually rotated, the lens support ring moves forward and rearward in the optical axis direction relative to the linear moving ring.

In an embodiment, the first movable ring is guided by the stationary barrel so as to be movable in the optical axis direction without rotating about the optical axis. The second movable ring is guided by the first movable ring to be movable in the optical axis direction without rotating about the optical axis.

In an embodiment, the stationary barrel includes a first linear guide portion which extends in the optical axis direction, wherein the second movable ring includes a second linear guide portion which extends in the optical axis direction. The first movable ring includes a first linear guide projection which extends parallel to the optical axis, and is engaged with the first linear guide portion to guide the first movable ring in the optical axis direction without rotating the first movable ring about the optical axis; and a second linear guide projection which extends parallel to the optical axis, and is engaged with the second linear guide portion to guide the second movable ring in the optical axis direction without rotating the second movable ring about the optical axis. The first linear guide projection and the second linear guide projection are formed on an outer peripheral surface of the first movable ring at the same position in a circumferential direction thereof and at different positions in the optical axis direction.

In an embodiment, the lens barrel further includes a rib-shaped extending guide projection formed on one of inner and outer peripheral surfaces of the stationary barrel to extend in a direction inclined with respect to the optical axis; and a follower projection formed on one of inner and outer peripheral surfaces of the drive ring to be engaged with the rib-shaped extending guide projection, the drive ring moving in the optical axis direction while rotating about the optical axis relative to the stationary barrel due to an engagement of the rib-shaped extending guide projection with the follower projection.

In an embodiment, the lens barrel further includes a guide projection which projects radially from one of a first peripheral surface of the drive ring and a second peripheral surface of the first movable ring, the first peripheral surface and the second peripheral surface facing each other; and a circumferential groove formed on the other of the first peripheral surface and the second peripheral surface. The guide projection is engaged in the circumferential groove, whereby the drive ring is rotatable about the optical axis relative to the first movable ring and integrally movable with the first movable ring in the optical axis direction.

In an embodiment, the lens barrel further includes a second rib-shaped extending guide projection formed on one of inner and outer peripheral surfaces of the drive ring to extend in a direction inclined with respect to both the optical axis and the direction in which the rib-shaped extending guide projection extends; and a lead groove formed on one of inner and outer peripheral surfaces of the second movable ring. The second rib-shaped extending guide projection is engaged in the lead groove, whereby the second movable ring moves in the optical axis direction relative to the drive ring when the drive ring is rotated about the optical axis relative to the stationary barrel.

In another embodiment, a lens barrel is provided, including a stationary barrel; a drive ring which is supported by the stationary barrel to move in a direction of the optical axis of a lens of the lens barrel, while rotating about the optical axis relative to the stationary barrel when rotated; and a first movable ring which supports a first lens group and is guided along the optical axis, the first movable ring being supported by the drive ring so that the drive ring is rotatable about the optical axis relative to the first movable ring and integrally movable with the first movable ring in the optical axis direction. The drive ring and the first movable ring move together in the optical axis direction while rotating about the optical axis relative to each other when the drive ring is rotated about the optical axis.

In an embodiment, the first movable ring includes a linear moving ring which is guided in the optical axis direction without rotating about the optical axis, the linear moving ring being supported by the drive ring so as to be relatively rotatable with respect to the drive ring about the optical axis and to be integrally movable with the drive ring in the optical axis direction; and a lens support ring which supports the first lens group, and is positioned in the linear moving ring to be supported thereby so that the lens support ring can be moved in the optical axis direction with respect to the linear moving ring while rotating about the optical axis relative to the linear moving ring. When the linear moving ring is moved forward and rearward in the optical axis direction, the lens support ring integrally moves forward and rearward together with the linear moving ring in the optical axis direction. When the lens support is individually rotated, the lens support ring moves forward and rearward in the optical axis direction relative to the linear moving ring.

In an embodiment, the lens barrel further includes a rib-shaped extending guide projection formed on one of inner and outer peripheral surfaces of the stationary barrel to extend in a direction inclined with respect to the optical axis; and a follower projection formed on one of inner and outer peripheral surfaces of the drive ring to be engaged with the rib-shaped extending guide projection, the drive ring moving in the optical axis direction while rotating about the optical axis relative to the stationary barrel due to an engagement of the rib-shaped extending guide projection with the follower projection.

In an embodiment, the lens barrel further includes a guide projection which projects radially from one of a first peripheral surface of the drive ring and a second peripheral surface of the first movable ring, the first peripheral surface and the second peripheral surface facing each other; and a circumferential groove formed on the other of the first peripheral surface and the second peripheral surface. The guide projection is engaged in the circumferential groove, whereby the drive ring is rotatable about the optical axis relative to the first movable ring and integrally movable with the first movable ring in the optical axis direction.

In an embodiment, the lens barrel further includes a second lens group, and a second movable ring which supports the second lens group, and is guided in the optical axis direction without rotating about the optical axis. The first movable ring holds the first lens group, and the second movable ring moves in the optical axis direction relative to the drive ring when the drive ring rotates about the optical axis relative to the stationary barrel.

In an embodiment, the lens barrel further includes a second rib-shaped extending guide projection formed on one of inner and outer peripheral surfaces of the drive ring to extend in a direction inclined with respect to both the optical axis and the direction in which the rib-shaped extending guide projection extends; and a lead groove formed on one of inner and outer peripheral surfaces of the second movable ring. The second rib-shaped extending guide projection is engaged in the lead groove, whereby the second movable ring moves in the optical axis direction relative to the drive ring when the drive ring is rotated about the optical axis relative to the stationary barrel.

In an embodiment, the first movable ring is guided by the stationary barrel to be movable in the optical axis direction without rotating about the optical axis. The second movable ring is guided by the first movable ring to be movable in the optical axis direction without rotating about the optical axis.

In an embodiment, the stationary barrel includes a first linear guide portion which extends in the optical axis direction; wherein the second movable ring includes a second linear guide portion which extends in the optical axis direction. The first movable ring includes a first linear guide projection which extends parallel to the optical axis and is engaged with the first linear guide portion to guide the first movable ring in the optical axis direction without rotating the first movable ring about the optical axis; and a second linear guide projection which extends parallel to the optical axis, and is engaged with the second linear guide portion to guide the second movable ring in the optical axis direction without rotating the second movable ring about the optical axis. The first linear guide projection and the second linear guide projection are formed on an outer peripheral surface of the first movable ring at the same position in a circumferential direction thereof, at different positions in the optical axis direction.

In another embodiment, a lens barrel is provided, including a stationary barrel; a drive ring which is supported by the stationary barrel to move in a direction of an optical axis while rotating about the optical axis relative to the stationary barrel when the drive ring is rotated; and a first movable ring which supports a first lens group and is guided in the optical axis direction without rotating about the optical axis, a rotation of the drive ring relative to the first movable ring causing the first movable ring to move in the optical axis direction relative to the drive ring. The first movable ring moves in the optical axis direction relative to the drive ring when the drive ring moves in the optical axis direction while being rotated about the optical axis.

In an embodiment, the lens barrel further includes a rib-shaped extending guide projection formed on one of inner and outer peripheral surfaces of the stationary barrel to extend in a direction inclined with respect to the optical axis; and a follower projection formed on one of inner and outer peripheral surfaces of the drive ring to be engaged with the rib-shaped extending guide projection, the drive ring moving in the optical axis direction while rotating about the optical axis relative to the stationary barrel due to an engagement of the rib-shaped extending guide projection with the follower projection.

In an embodiment, the lens barrel further includes a second rib-shaped extending guide projection formed on one of inner and outer peripheral surfaces of the drive ring to extend in a direction inclined with respect to both the optical axis and the direction in which the rib-shaped extending guide projection extends; and a lead groove formed on one of inner and outer peripheral surfaces of the first movable ring. The second rib-shaped extending guide projection is engaged in the lead groove, whereby the first movable ring moves in the optical axis direction relative to the drive ring when the drive ring is rotated about the optical axis relative to the stationary barrel.

In an embodiment, the lens barrel further includes a second lens group, and a second movable ring which supports the second lens group and is guided in the optical axis direction. The first movable ring supports the first lens group; and the second movable ring is supported by the drive ring so that the drive ring is rotatable about the optical axis relative to the second movable ring and integrally movable with the second movable ring in the optical axis direction.

In an embodiment, the second movable ring includes a linear moving ring which is guided in the optical axis direction without rotating about the optical axis, the linear moving ring being supported by the drive ring so as to be relatively rotatable with respect to the drive ring about the optical axis, and to be integrally movable with the drive ring in the optical axis direction; and a lens support ring which supports the second lens group, and is positioned in the linear moving ring to be supported thereby so that the lens support ring can be moved in the optical axis direction with respect to the linear moving ring while rotating about the optical axis relative to the linear moving ring. When the linear moving ring is moved forward and rearward in the optical axis direction, the lens support ring integrally moves forward and rearward together with the linear moving ring in the optical axis direction. When the lens support is individually rotated, the lens support ring moves forward and rearward in the optical axis direction relative to the linear moving ring.

In an embodiment, the lens barrel further includes a guide projection which projects radially from one of a first peripheral surface of the drive ring and a second peripheral surface of the second movable ring, the first peripheral surface and the second peripheral surface facing each other; and a circumferential groove formed on the other of the first peripheral surface and the second peripheral surface. The guide projection is engaged in the circumferential groove, whereby the drive ring is rotatable about the optical axis relative to the second movable ring and integrally movable with the second movable ring in the optical axis direction.

In an embodiment, the second movable ring is guided by the stationary barrel to be movable in the optical axis direction without rotating about the optical axis; and the first movable ring is guided by the second movable ring to be movable in the optical axis direction without rotating about the optical axis.

In an embodiment, the stationary barrel includes a first linear guide portion which extends in the optical axis direction. The first movable ring includes a second linear guide portion which extends in the optical axis direction. The second movable ring includes a first linear guide projection which extends parallel to the optical axis and is engaged with the first linear guide portion to guide the second movable ring in the optical axis direction without rotating the second movable ring about the optical axis; and a second linear guide projection which extends parallel to the optical axis and is engaged with the second linear guide portion to guide the first movable ring in the optical axis direction without rotating the first movable ring about the optical axis. The first linear guide projection and the second linear guide projection are formed on an outer peripheral surface of the second movable rings at the same position in a circumferential direction thereof at different positions in the optical axis direction.

In another embodiment, a lens barrel is provided, including a stationary barrel; a hand-operated ring supported by the stationary barrel to be manually rotated; a lens group which is movable in a direction of the optical axis thereof; a lever which is fixed, at one end thereof, to an inner peripheral surface of the hand-operated ring, and wherein the other end of the lever is associated with the lens group, wherein a rotation of the hand-operated ring causes the lens group to move in the optical axis direction via the lever; a driving gear; and an annular gear, provided independently of the hand-operated ring, which meshes with the driving gear, the center of the annular gear being positioned on the optical axis. The annular gear is supported by the stationary barrel to be rotatable about the optical axis relative to the stationary barrel. The annular gear and the hand-operated ring are engaged with each other so as to move integrally in a circumferential direction of the lens barrel via the lever.

In an embodiment, the annular gear includes a radial bottomed groove which is formed on a front surface of the annular gear to extend in a radial direction of the lens barrel, the front surface facing forward of the optical axis direction. The lever includes a radial portion which is engaged in the radial bottomed groove to be immovable in the circumferential direction relative to the radial bottomed groove.

In an embodiment, the lever includes a pair of parallel arms which extend forward from the radial portion of the lever at different radial positions thereat; wherein one of the pair of parallel arms is fixed to the hand-operated ring; and wherein the other of the pair of parallel arms is connected to a lens supporting member, which supports the lens group, whereby the hand-operated ring is integrally movable with the lens supporting member in a circumferential direction.

In an embodiment, the stationary barrel includes a set of projections at different positions on the stationary barrel in a circumferential direction about the optical axis; and the annular gear includes a corresponding set of circumferential grooves, in which the set of projections are respectively engaged, whereby the annular gear is rotatably supported by the stationary barrel.

In an embodiment, the annular gear is molded with synthetic resin.

In an embodiment, the lens barrel can be mounted to, and dismounted from, a camera body, the camera body including a second driving gear which gives rotation to the driving gear.

In an embodiment, the lens group serves as a focusing lens group, the rotation of the hand-operated ring causing the focusing lens group to move in the optical axis direction via the lever to perform a focusing operation.

The lens barrel can constitute a zoom lens barrel, the lens group can also serve as a lens group of a zoom lens system, wherein the lens barrel further includes a linear moving ring which is guided in the optical axis direction without rotating about the optical axis, the linear moving ring being moved when a zooming operation is performed; and a lens support ring which supports the focusing lens group, and is positioned in the linear moving ring to be supported thereby, so that the lens support ring can be moved in the optical axis direction with respect to the linear moving ring while rotating about the optical axis relative to the linear moving ring. The rotation of the hand-operated ring is transferred to the lens support ring via the lever. The lens support ring moves forward and rearward in the optical axis direction relative to the linear moving ring when rotated forwardly and reversely via the lever, respectively.

In an embodiment, the lens barrel serves as a zoom lens barrel, the lens group including a plurality of movable lens groups serving as a zoom lens system, the rotation of the hand-operated ring causing the plurality of movable lens groups to move in the optical axis direction to vary a focal length.

The present disclosure relates to subject matter contained in Japanese Patent Applications Nos.2001-32056, 2001-32057, 2001-32058 and 2001-32059 (all filed on Feb. 8, 2001) which are expressly incorporated herein by reference in their entireties.

BRIEF DESCRIPTION OF THE DRAWINGS

The present invention will be described below in detail with reference to the accompanying drawings in which.

DESCRIPTION OF THE EMBODIMENT

Figure 1:
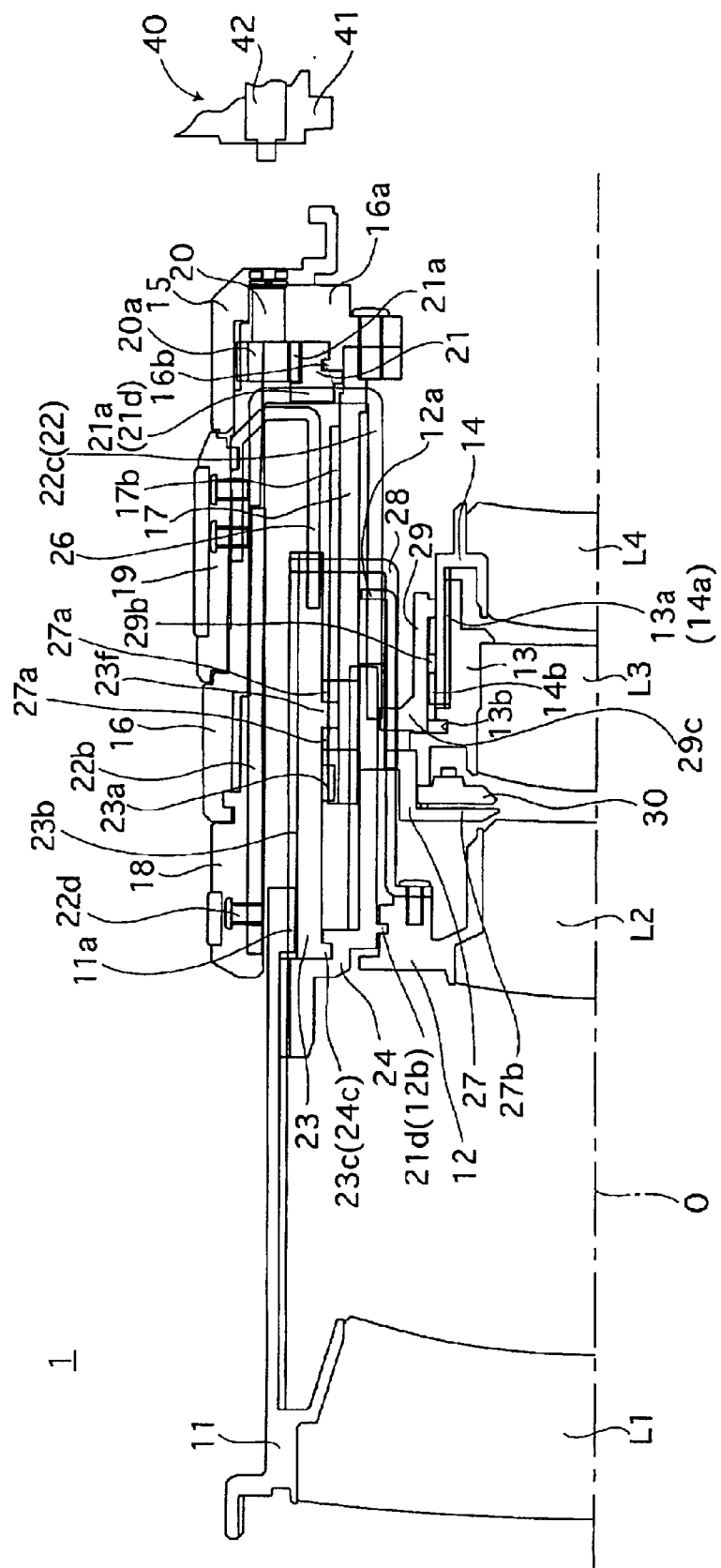
FIG. 1 is an axial cross sectional view of an embodiment of a zoom lens barrel according to the present invention, showing the zoom lens barrel above the optical axis thereof, when the focal length is set to telephoto extremity.
Figure 2:
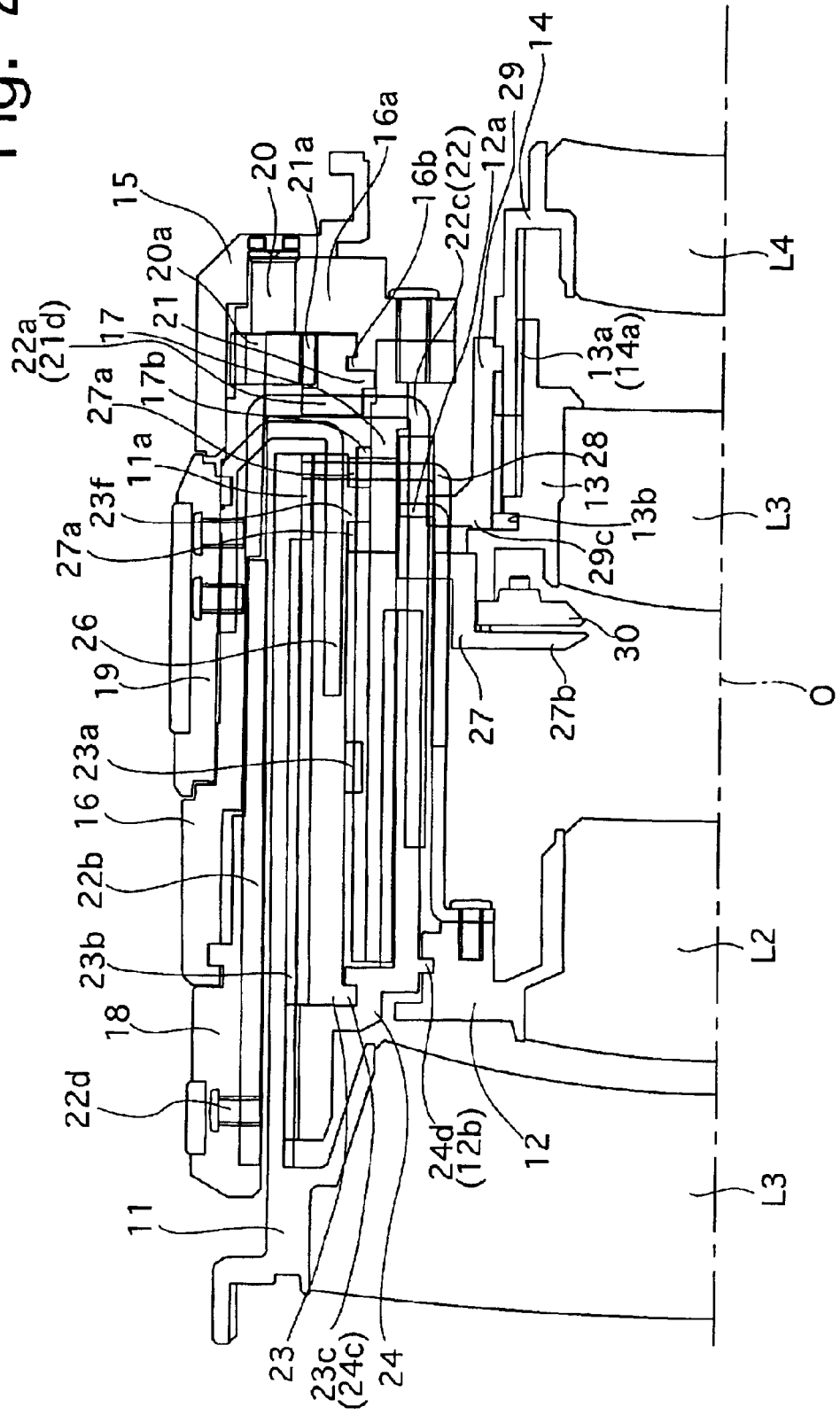
FIG. 2 is an axial cross sectional view of the zoom lens barrel shown in FIG. 2, showing the zoom lens barrel above the optical axis thereof, when the focal length is set to wide-angle extremity.

As shown in FIGS. 1 and 2, an embodiment of a zoom lens barrel to which the present invention is applied, i.e., a zoom lens barrel (zoom lens system) 1, is designed as an interchangeable lens of an SLR camera system, and is provided with a zoom lens optical system consisting of four lens groups: a first lens group L1, a second lens group L2, a third lens group L3 and a fourth lens group L4 in that order from the object side (the left side as viewed in FIG. 1). The first lens group L1, the second lens group L2, the third lens group L3 and the fourth lens group L4 are directly supported by a first lens frame (lens support ring) 11, a second lens frame (lens support ring) 12, a third lens frame (lens support ring) 13 and a fourth lens frame (lens support ring) 14, respectively. Each of the first through fourth lens groups L1, L2, L3 and L4 is driven to move along an optical axis O while varying the respective distances thereamong to perform zooming operation. The second lens group L2 serves not only as a lens group of a zoom lens optical system but also as a focusing lens group. When a focusing operation is carried out, only the second lens group L2, among the four lens groups, is driven to move along the optical axis O while rotating about the optical axis O.

Figure 19:
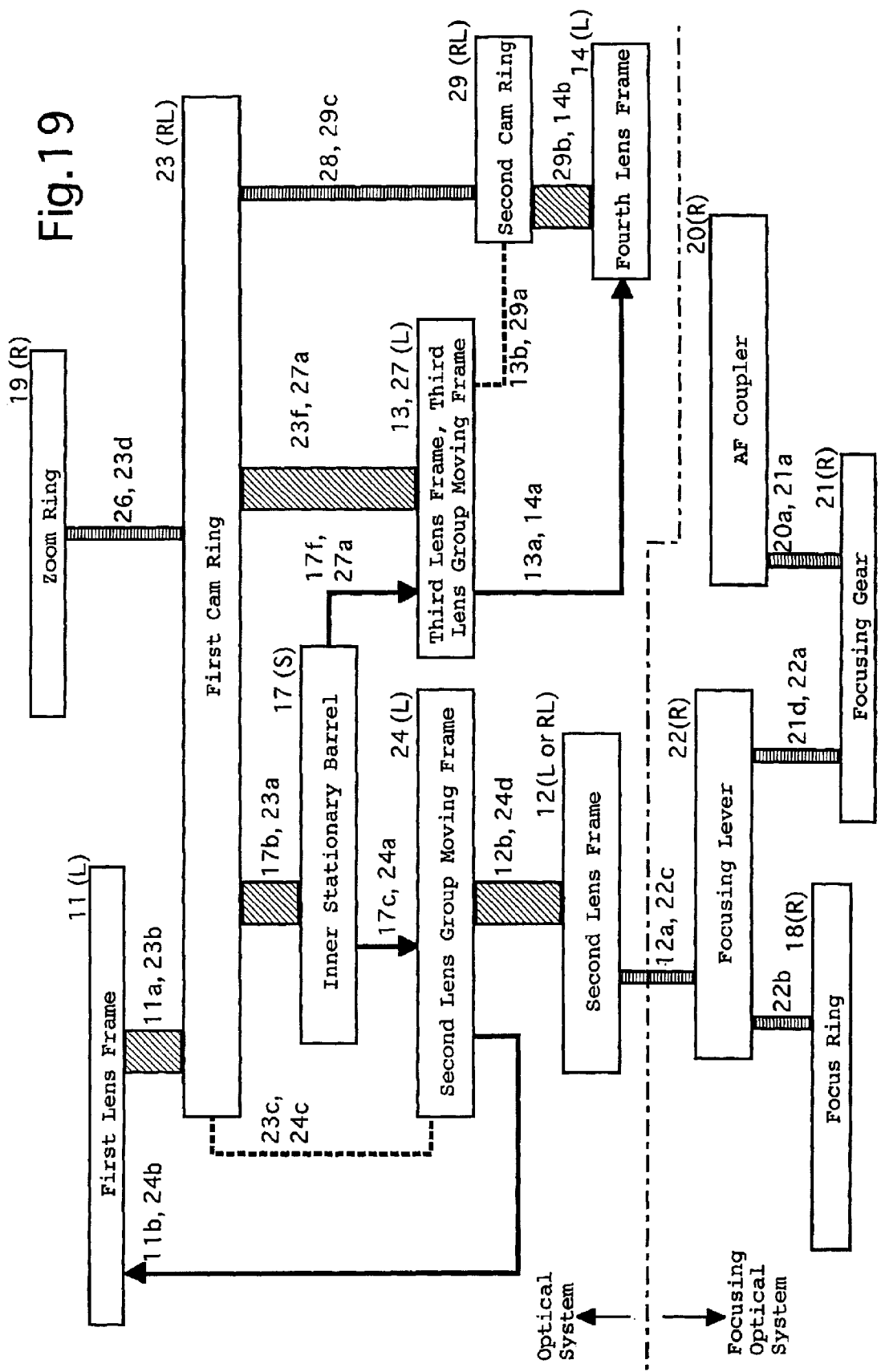
FIG. 19 is a conceptual diagram of interrelationships among fundamental elements of the zoom lens barrel shown in FIGS. 1 and 2, showing extending guide mechanisms, rotational transfer mechanisms, and other mechanisms, of the fundamental elements of the zoom lens barrel.

FIG. 19 shows a block diagram of fundamental elements of the zoom lens barrel 1 for the purpose of making the mechanical power transfer paths in the zoom lens barrel 1 easily understandable. In FIG. 19, the parenthesized capital S suffix on the reference numeral indicates that the member is a stationary member, the parenthesized capital L suffix on the reference numeral indicates that the member is a linearly movable member which linearly moves along the optical axis O without rotating about the optical axis O, the parenthesized capital R suffix on the reference numeral indicates that the member is a rotatable member which rotates about the optical axis O without moving along the optical axis O, and the parenthesized capital RL suffix on the reference numeral indicates that the member is a movable member which moves along the optical axis O while rotating about the optical axis O. In addition, in FIG. 19, the arrow which extends from one block to another indicates that the member (represented by a rectangular block) at the beginning of the arrow guides another member (represented by a rectangular block) at the end of the arrow along the optical axis O, while the broken line which extends between two blocks indicates that the two members (each represented by a rectangular block) are engaged with each other so as to be rotatable relative to each other about the optical axis O and immovable along the optical axis O relative to each other. In additional, in FIG. 19 the diagonally shaded strip which extends between two blocks indicates a lead or cam mechanism (an extending guide mechanism) via which a rotation of one of two members (each represented by a rectangular block) causes the other member to move along the optical axis O, and the horizontally-hatched strip which extends between two blocks indicates a rotational transfer mechanism via which a rotation of one of the two members (each represented by a rectangular block) causes the other member to rotate about the optical axis O. In the description of the present invention, the lead mechanism is defined as a mechanism which provides a movable member with a movement in the direction of the optical axis O (i.e., in the optical axis direction) by rotation of a rotating ring having a linear relationship between the amount of movement of the movable member and the angle of rotation of the rotating ring, and the cam mechanism is defined as a mechanism which provides a movable member with movement in the direction of the optical axis O (i.e., in the optical axis direction) by rotation of a rotating ring having a non-linear relationship between the amount of movement of the movable member and the angle of rotation of the rotating ring.

Figure 3:
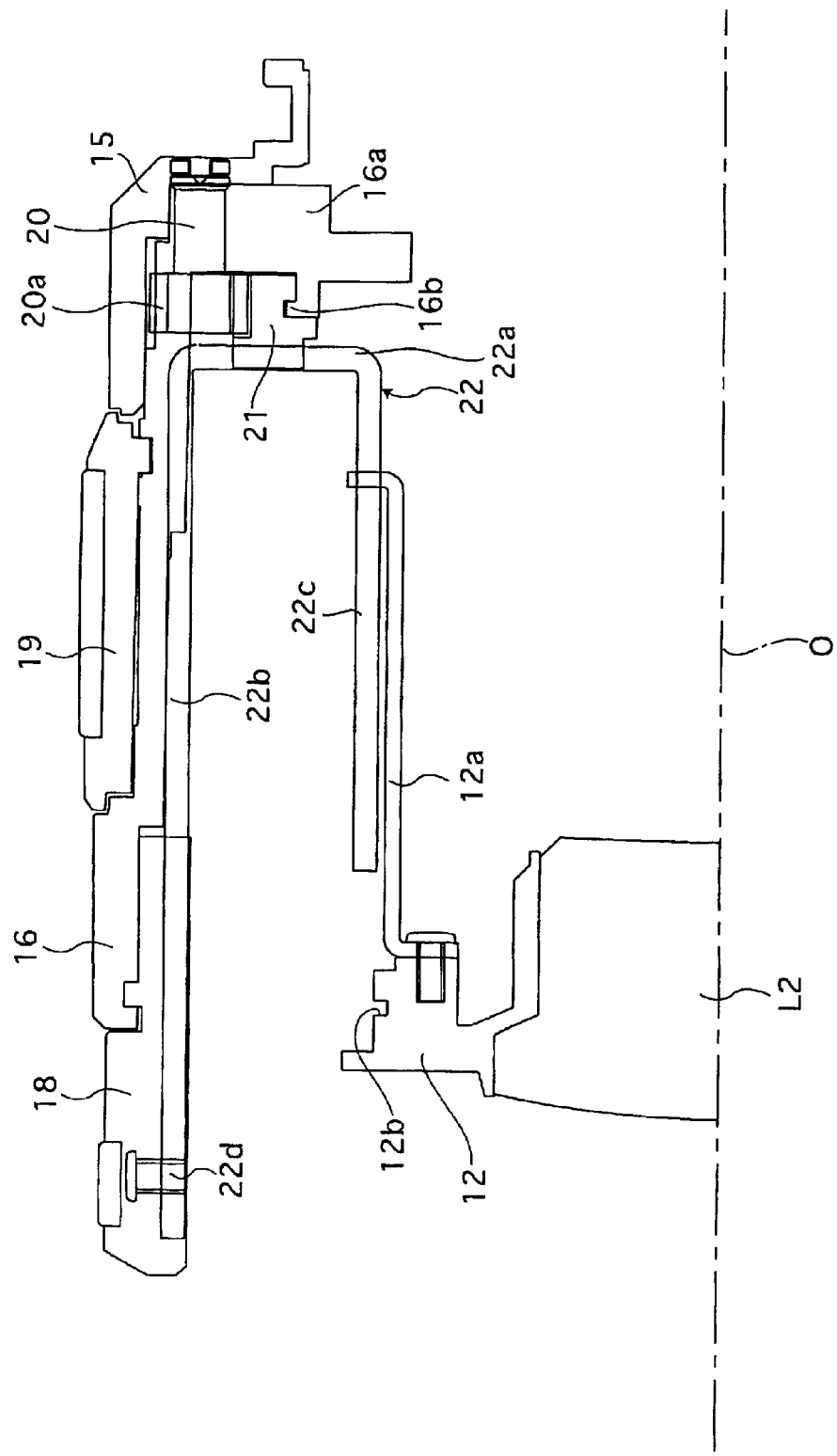
FIG. 3 is an axial cross sectional view of fundamental elements of a focusing lens driving system of the zoom lens barrel shown in FIGS. 1 and 2.

The zoom lens barrel 1 is provided with an annular lens mount 15, an outer stationary barrel 16, and an inner stationary barrel 17 which are all stationary members of the zoom lens barrel 1. The lens mount 15 is fixed at the rear end of the zoom lens, and is mounted to, and dismounted from, a corresponding annular body mount 41 of an SLR camera body 40. The outer stationary barrel 16 is fixed to the lens mount 15. As can be seen in FIGS. 1 and 2, a portion of the outer stationary barrel 16 is exposed to the outside of the zoom lens barrel 1. The inner stationary barrel 17 is fixed to the outer stationary barrel 16. No portion of the inner stationary barrel 17 is exposed to the outside of the zoom lens barrel 1. The zoom lens barrel 1 is provided with a focusing ring (manual focus ring/hand-operated ring) 18 and a zoom ring 19, each of which is supported to be rotatable about the optical axis O and immovable in the optical axis direction. As shown in FIG. 3, the focusing ring 18 is fitted in the outer stationary barrel 16 to be supported thereby so that a front end portion (a hand-operated portion) of the focusing ring 18 is positioned in the front of the outer stationary barrel 16. The zoom ring 19 is fitted on the outer stationary barrel 16 to be supported thereby so that a front end portion (a hand-operated portion) of the outer stationary barrel 16 is positioned in front of the zoom ring 19.

The zoom lens barrel 1 is provided at the rear end thereof with an AF coupler (female coupler/driving gear) which extends parallel to the optical axis O from a rear surface (engaging surface) of the lens mount 15 to the inside of the zoom lens barrel 1. The AF coupler 20 extends through a hole of an inner flange 16a formed at the rear end of the outer stationary barrel 16 so that a gear portion 20a formed at the front of the AF coupler is positioned immediately in front of the inner flange 16a. When the lens mount 15 is mounted to the body mount 41, the AF coupler 20 is engaged with the front end of an AF coupler (male coupler) 42 which slightly projects from a front surface (engaging surface) of the body mount 41 of the camera body 40. Once the AF coupler 20 is correctly engaged with the AF coupler 42, a rotation of the AF coupler 42 causes the AF coupler 20 to rotate together with the AF coupler 42.

Figure 4:
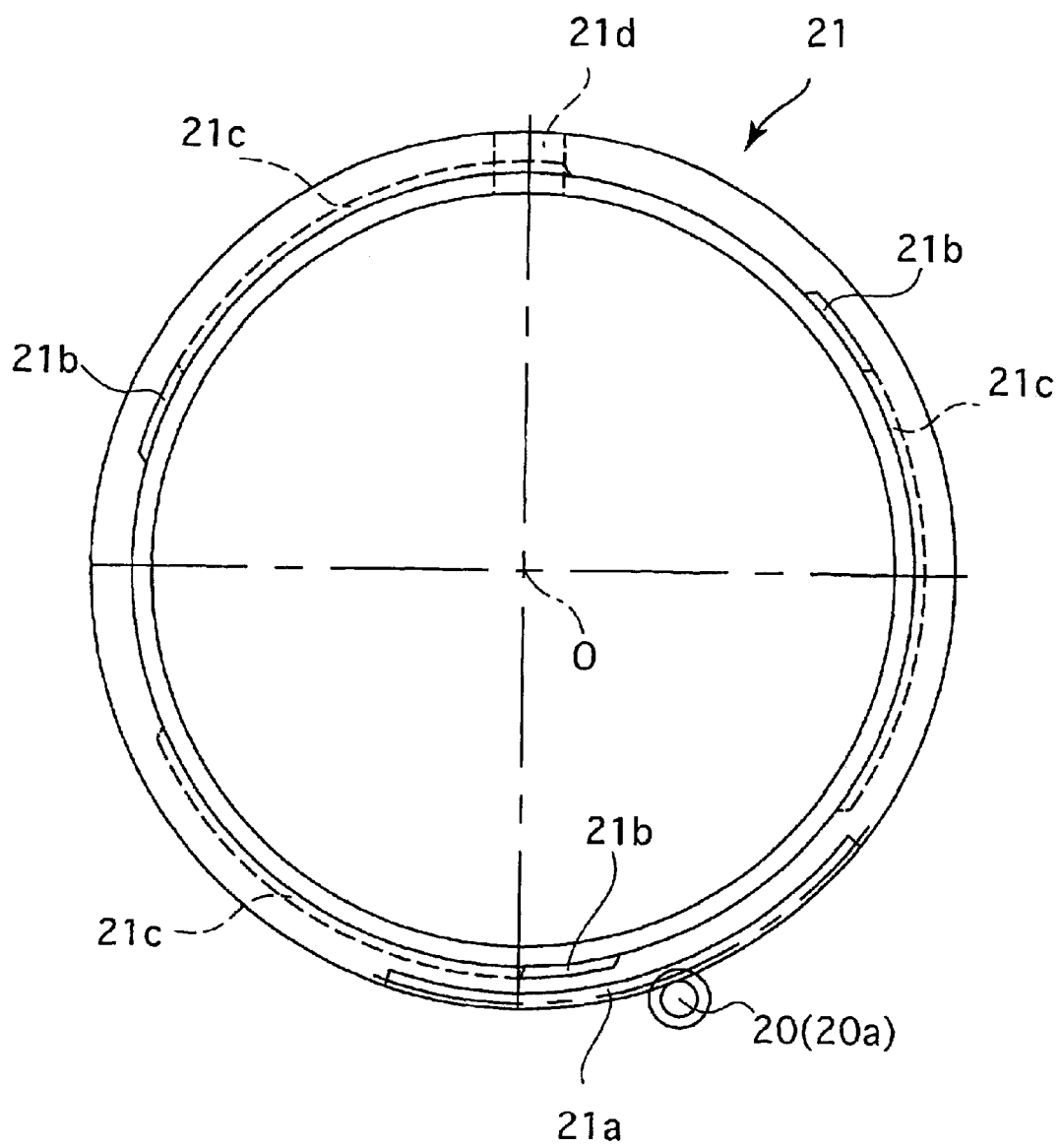
FIG. 4 is a rear elevational view of a focusing gear provided as an element of the zoom lens barrel shown in FIGS. 1 and 2.
Figure 5:
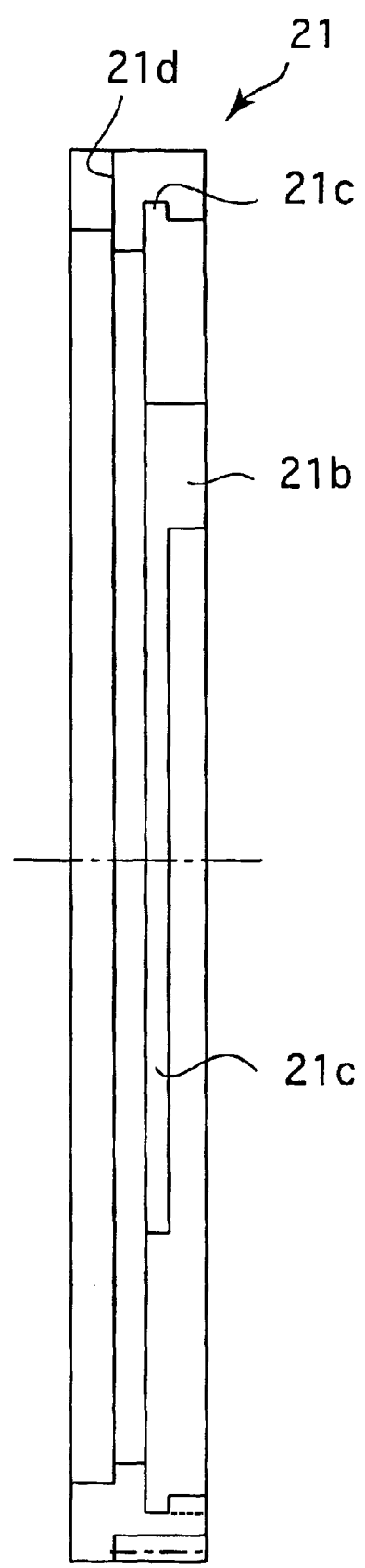
FIG. 5 is a side elevational view of the focusing gear shown in FIG. 4.

The zoom lens barrel 1 is provided therein, immediately in front of the inner flange 16a, with a focusing gear (annular gear) 21. The focusing gear 21 is provided on an outer peripheral surface thereof with a sector gear portion 21a which meshes with the gear portion 20a of the AF coupler 20. The focusing gear 21 is supported by the inner flange 16a to be rotatable about the optical axis O in forward and reverse directions by a predetermined angle of rotation. As shown in FIGS. 4 and 5, the focusing gear 21 is provided with three leading grooves 21b which extend parallel to the optical axis O, and three arc grooves 21c which circumferentially extend about the optical axis O. Three outer projections 16b formed on the outer stationary barrel 16 can be inserted into the three arc grooves 21c via the three leading grooves 21b, respectively. Each of the three arc grooves 21c makes it possible for the corresponding outer projection 16b to be slidable along the arc groove 21c within a predetermined range. Accordingly, the outer projections 16b and the three arc grooves 21c define the range of rotation of the focusing gear 21 about the optical axis O relative to the outer stationary barrels 16. Forward and reverse rotations of the gear portion 20a of the AF coupler 20 cause the focusing gear 21 to rotate about the optical axis O in forward and reverse directions, respectively, without moving in the optical axis direction relative to the outer stationary barrels 16. Namely, rotation of the AF coupler 20 is transferred to the focusing gear 21 via the gear portion 20a and the sector gear portion 21a. During normal operation of the zoom lens barrel 1, the relative position of each of the three outer projections 16b is never moved to one end (upper end as viewed in FIG. 5) of the associated arc groove 21c, which is connected to the associated leading groove 21b, so that each outer projection 16b never comes out of the associated arc groove 21c.

The focusing gear 21 is provided at a predetermined circumferential position with a radial insertion groove 21d in which a radial portion 22a (see FIG. 6) of a focusing lever 22 is engaged. The focusing lever 22 is provided with the radial portion 22a, an outer long arm 22b which extends forward in a direction parallel to the optical axis O from an outer end (upper end as viewed in FIG. 6) of the focusing lever 22, and an inner short arm 22c which extends forward in a direction parallel to the optical axis O from an inner end (lower end as viewed in FIG. 6) of the focusing lever 22. The outer long arm 22b is fixed to the inner peripheral surface of the focusing ring 18 by a set screw 22d (see FIGS. 1, 2 and 3). The inner short arm 22c is engaged with a rotational transfer arm 12a so as to be movable in the optical axis direction relative to the rotational transfer arm 12a, which is fixed to the second lens frame 12. Rotation of the focusing lever 22 is transferred to the second lens frame 12 via the inner short arm 22c and the rotational transfer arm 12a (see FIG. 3). The rotational transfer arm 12a is an elongated member extending substantially parallel to the optical axis O, and is provided at the rear end thereof with a bifurcated portion which holds the inner short arm 22c so that the inner short arm 22c is movable relative to the rotational transfer arm 12a. With this structure, the focusing ring 18 and the focusing gear 21 rotate together about the optical axis O when the focusing ring 18 is manually turned or when the focusing gear 21 is driven to rotate. Therefore, the focusing gear 21 rotates together with the focusing ring 18 when the focusing gear 21 is rotated by rotation of the AF coupler 20. On the other hand, the focusing ring 18 rotates together with the focusing gear 21 when the focusing ring 18 is manually turned. In either case, the second lens frame 12 that supports the second lens group L2 is rotated about the optical axis O via the inner short arm 22c and the rotational transfer arm 12a. The radial insertion groove 21d of the focusing gear 21 and the radial portion 22a of the focusing lever 22 only need to function to prevent the focusing gear 21 and the focusing lever 22 from rotating about the optical axis O relative to each other, so that the radial portion 22a can be fixed to the radial insertion groove 21d by an adhesive or can simply be fitted in the radial insertion groove 21d.

Figure 7:
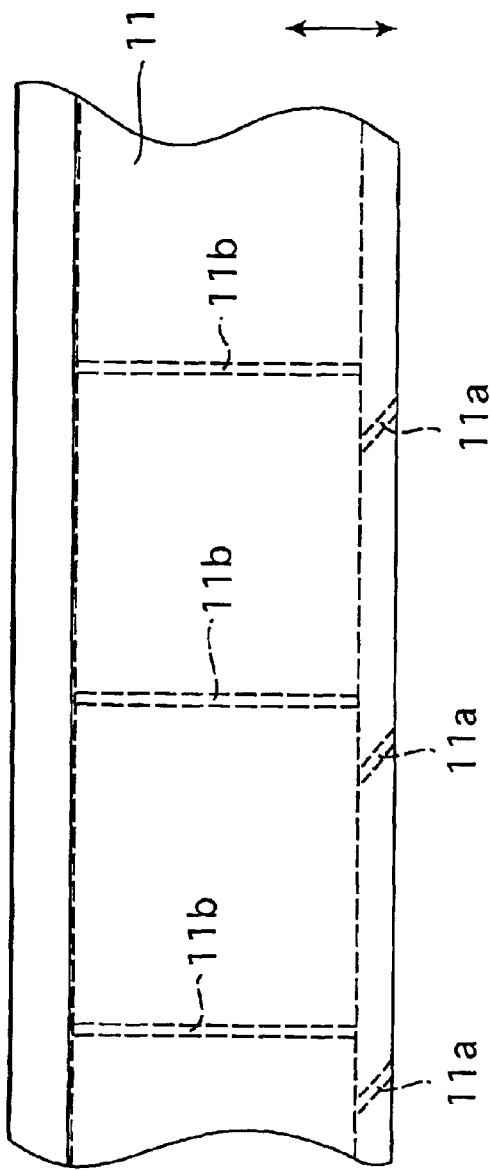
FIG. 7 is a developed view of an outer peripheral surface of a first lens frame provided as an element of the zoom lens barrel shown in FIGS. 1 and 2.
Figure 8:
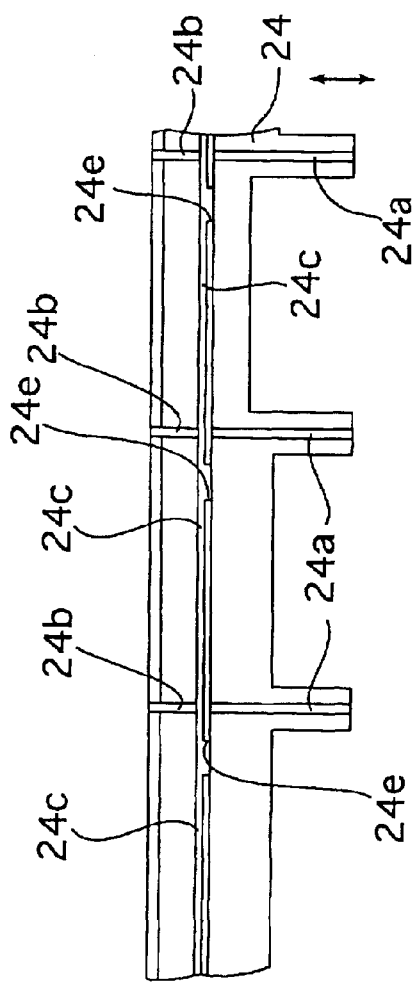
FIG. 8 is a developed view of an outer peripheral surface of a second lens group moving frame provided as an element of the zoom lens barrel shown in FIGS. 1 and 2.
Figure 9:
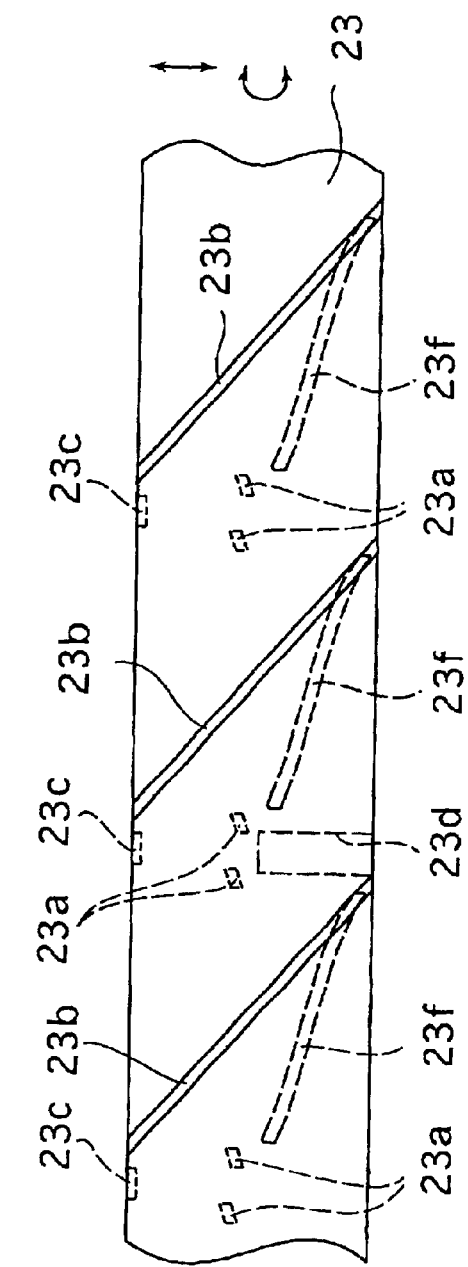
FIG. 9 is a developed view of an outer peripheral surface of a first cam ring provided as an element of the zoom lens barrel shown in FIGS. 1 and 2.
Figure 10:
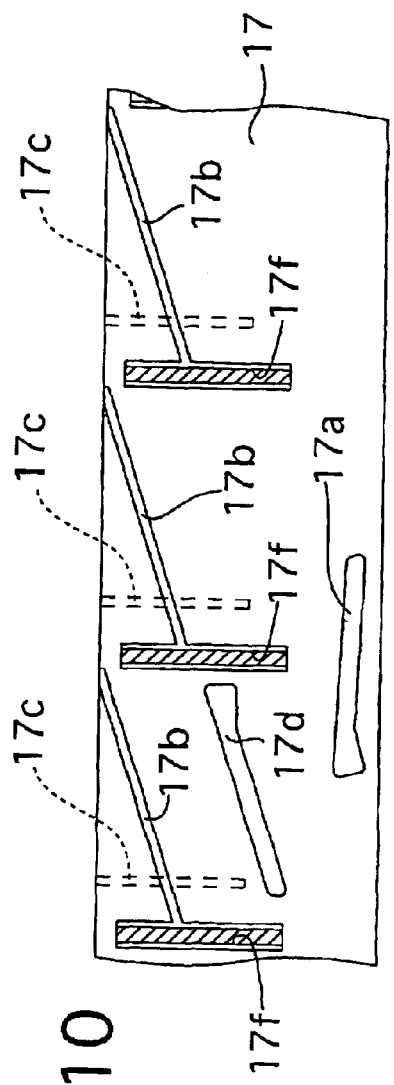
FIG. 10 is a developed view of an outer peripheral surface of an inner stationary barrel provided as an element of the zoom lens barrel shown in FIGS. 1 and 2.

As shown in FIG. 10, the inner stationary barrel 17 is provided with a circumferential through slot 17a in which the focusing lever 22 is inserted to be rotatable about the optical axis O relative to the inner stationary barrel 17 within a predetermined range defined by the circumferential length of the circumferential through slot 17a. The inner stationary barrel 17 is provided on outer peripheral surface thereof with a set of three rib-like lead protrusions 17b which extend obliquely to both the optical axis direction and the circumferential direction of the inner stationary barrel 17. The zoom lens barrel 1 is provided between the first lens frame 11 and the second lens frame 12 with a first cam ring (rotating ring/drive ring) 23. Each of the three lead protrusions 17b is engaged with a corresponding pair of follower projections 23a formed on an inner surface of the first cam ring 23 so that each pair of follower projections 23a are in sliding contact with opposite (both) sides of the corresponding lead protrusion 17b, respectively. As shown in FIG. 9, the first cam ring 23 is provided on an outer peripheral surface thereof with a set of three rib-like lead protrusions (extending guide portions) 23b which extend obliquely to both the optical axis direction and the circumferential direction of the first cam ring 23 in a direction opposite to the direction in which the set of three rib-like lead protrusions 17b are inclined. The three lead protrusions 23b are slidably engaged in three lead grooves (extending guide portion) 11a (see FIG. 7) formed on an inner surface of the first lens frame 11, respectively. The inner stationary barrel 17 is provided on an inner peripheral surface thereof with a set of three linear guide grooves (linear guide portions) 17c which extend parallel to the optical axis O. The zoom lens barrel 1 is provided between the first cam ring 23 and the second lens frame 12 with a second lens group moving frame (linear moving ring) 24. The second lens group moving frame 24 is an annular member, and is provided on an outer peripheral surface thereof with a set of three linear guide elongated projections 24a (see FIG. 8) which extend parallel to the optical axis O to be slidably engaged in the set of three linear guide grooves 17c of the inner stationary barrel 17, respectively. The first lens frame 11 is provided on an inner surface thereof with a set of three linear guide grooves 11b which extend parallel to the optical axis O. The second lens group moving frame 24 is provided on an outer peripheral surface thereof with another set of three linear guide elongated projections (linear guide portions) 24b which extend parallel to the optical axis O to be slidably engaged in the set of three linear guide grooves 11b of the first lens frame 11, respectively.

Due to the engagement of the linear guide grooves 17c with the linear guide elongated projections 24a, and the engagement of the linear guide grooves 11b with the linear guide elongated projections 24b, the second lens group moving frame 24 and the first lens frame 11 are allowed to move in the optical axis direction relative to the inner stationary barrel 17, and are prevented from rotating about the optical axis O relative to the inner stationary barrel 17. Accordingly, each of the first lens frame 11 and the second lens group moving frame 24 is linearly movable in the optical axis direction and not rotatable about the optical axis O.

As shown in FIG. 9, the first cam ring 23 is provided, on an inner peripheral surface thereof at the front end of the first cam ring 23, with a set of three guide projections (engaging portion) 23c which extend radially inwards. The second lens frame 24 is provided on an outer peripheral surface thereof with a circumferential groove (guiding portion) 24c, in which the three guide projections 23c of the first cam ring 23 are engaged, to be slidable in the circumferential groove 24c therealong and to be immovable in the optical axis direction relative to the second lens frame 24. Accordingly, the first cam ring 23 is movable in the optical axis direction together with the second lens group moving frame 24, and is rotatable about the optical axis O relative to the second lens group moving frame 24. Although, during assembly, the three guide projections 23c of the first cam ring 23 are inserted into the circumferential groove 24c via three insertion grooves 24e (see FIG. 8) formed adjoining to the circumferential groove 24c, respectively, during normal operation of the zoom lens barrel 1, the three guide projections 23c never move to positions (engaging/disengaging positions) on the circumferential groove 24c adjoining to the three insertion grooves 24e, respectively. Therefore, each guide projection 23c never comes out of the circumferential groove 24c during operation of the zoom lens barrel 1.

Figure 15:
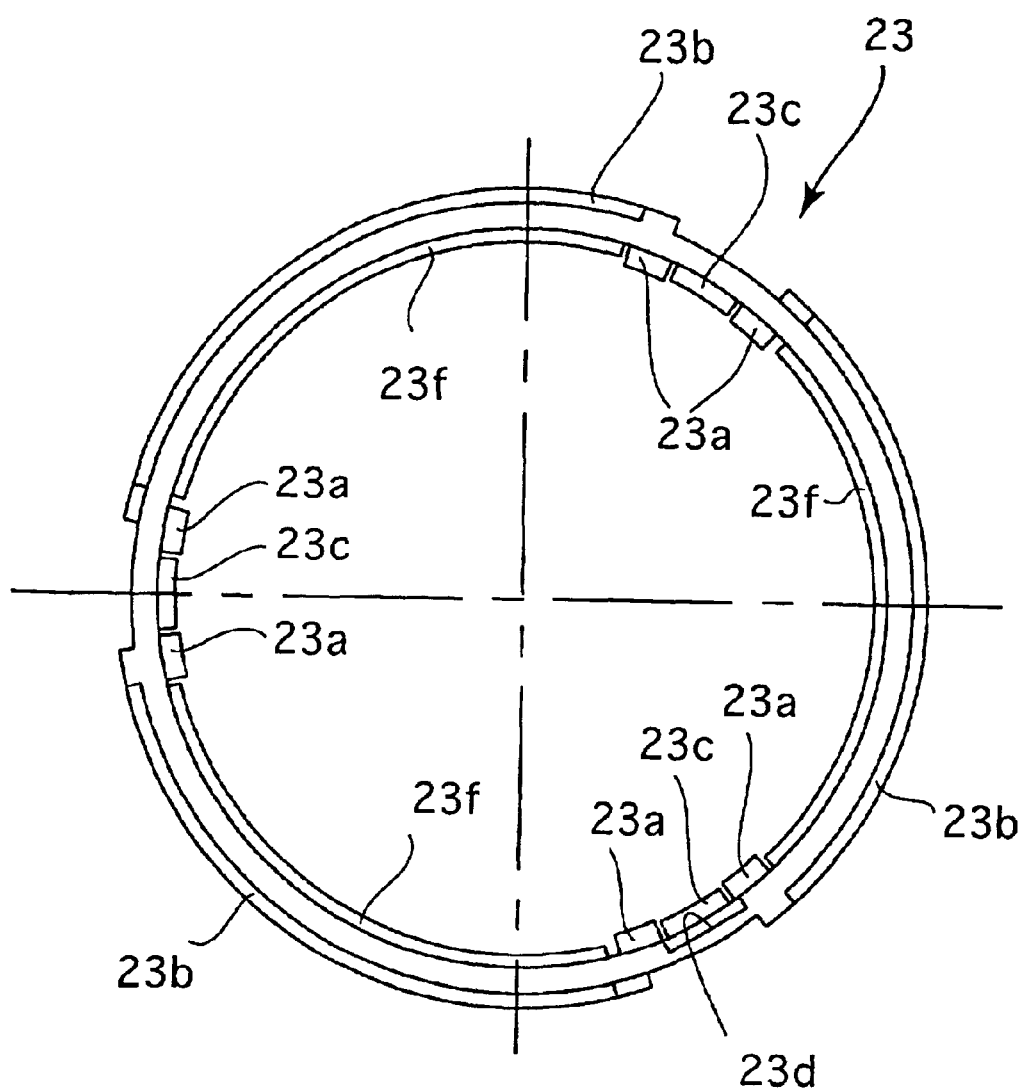
FIG. 15 is a rear elevational view of the first cam ring shown in FIG. 9.

The first cam ring 23 is provided on an inner peripheral surface thereof with a rotational transfer recess 23d which extends parallel to the optical axis O. A zoom lever (see FIGS. 1 and 2) 26 which is fixed to an inner peripheral surface of the zoom ring 19 is engaged in the rotational transfer recess 23d to be movable in the optical axis direction relative to the first cam ring 23 and not to be rotatable about the optical axis O relative to the first cam ring 23, so that rotation of the zoom ring 19 is transferred to the first cam ring 23 via the zoom lever 26. The shape of the zoom lever 26 is similar to that of the focusing lever 22. If the first cam ring 23 is rotated, the first cam ring 23 moves in the optical axis direction due to the engagement of the three pairs of follower projections 23a with the three lead protrusions 17b. Although the zoom ring 19 rotates at a predetermined axial position, i.e., without moving in the optical axis direction, the first cam ring 23 that rotates together with the zoom ring 19 rotates while moving in the optical axis direction. The second lens group moving frame 24, which is guided in the optical axis direction, moves together with the first cam ring 23 in the optical axis direction but does not rotate about the optical axis O due to the engagement of the circumferential groove 24c with the three guide projections 23c. FIG. 15 is a rear view of the first cam ring 23, as viewed from the rear thereof along the optical axis O.

As shown in FIGS. 1 and 2, the second lens group moving frame 24 is provided, on an inner peripheral surface thereof in the vicinity of the front end of the second lens group moving frame 24, with a set of three follower pins 24d which are respectively engaged in a set of three lead grooves (or a set of three cam grooves) 12b formed on an outer peripheral surface of the second lens frame 12. If the second lens group 12 rotates by rotation of the focusing ring 18 or the AF coupler 20, the second lens frame 12, which supports the second lens group L2, moves in the optical axis direction due to the engagement of the three follower pins 24d with the three lead grooves (or three cam grooves) 12b. On the other hand, if the first cam ring 23 rotates via rotation of the zoom ring 19, the second lens frame 12 and the second lens group moving frame 24 do not rotate relative to each other, so that the second frame 12, which supports the second lens group L2, moves linearly in the optical axis direction without rotating about the optical axis O during a zooming operation. In addition, when the first cam ring 23 rotates via rotation of the zoom ring 19, the first lens frame 11, which supports the first lens group L1, moves linearly in the optical axis direction without rotating about the optical axis O due to the engagement of the three linear guide grooves 11b with the three linear guide elongated projections 24b.

The movement of the zooming operation with respect to the first and second lens groups L1 and L2, and the movement of the focusing operation via the second lens group L2 are understood from the above descriptions. The movement of the zooming operation with respect to the third and fourth lens groups L3 and L4 will be hereinafter discussed.

The zoom lens barrel 1 is provided therein with a second cam ring drive lever 28 which is fixed to the rear end of the first cam ring 23. A middle portion of the second cam ring drive lever 28 extends parallel to the optical axis O, and a rear end portion of the second cam ring drive lever 28 extends radially outwards from the rear end of the middle portion of the second cam ring drive lever 28, in a direction perpendicular to the optical axis O, to pass through an elongated through hole 17d (see FIG. 10) formed on the inner stationary barrel 17. The inner stationary barrel 17 is provided with a set of three through slots (linear guide portions) 17f which extend parallel to the optical axis O. The set of three through slots 17f serves as a guiding device for indirectly guiding the third lens frame 13 in the optical axis direction.

Figure 11A:
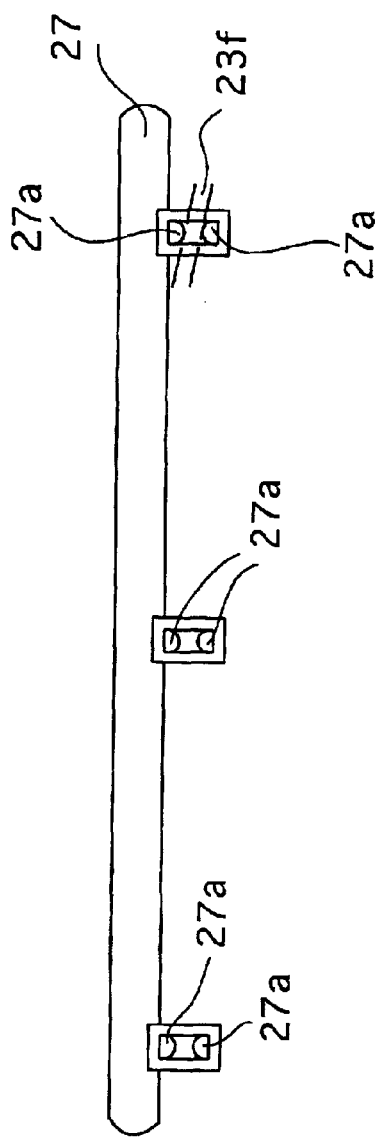
FIG. 11A is a developed view of an outer peripheral surface of a third lens group moving frame provided as an element of the zoom lens barrel shown in FIGS. 1 and 2.
Figure 11B:
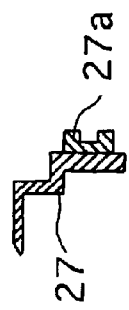
FIG. 11B is a cross sectional view of the third lens group moving frame shown in FIG. 11A.

The zoom lens barrel 1 is provided between the inner stationary barrel 17 and the second lens frame 13 with a third lens group moving frame 27. The third lens group moving frame 27 is an annular member, and is provided with a set of three pairs of follower pins (extending guide portions) 27a (see FIGS. 1 and 11) which are engaged in the set of three through slots 17f, respectively. The set of three pairs of follower pins 27a and the corresponding set of three through slots 17f serves as a linear guide device. The third lens group moving frame 27 is fitted in the inner stationary barrel 17 to be movable in the optical axis O direction relative to the inner stationary barrel 17 by the engagement of the three pairs of follower pins 27a and the three through slots 17f. The third lens group moving frame 27 is prevented from rotating about the optical axis relative to the inner stationary barrel 17. The first cam ring 23 is provided on an inner peripheral surface thereof with set of three rib-like cam protrusions (extending guide portion) 23f each of which is slidably held between the corresponding pair of follower pins 27a. With this structure, a rotation of the first cam ring 23 causes the third lens group moving frame 27 to move in the optical axis direction without rotating about the optical axis O due to the engagement of the three cam protrusions 23f with the three pairs of follower pins 27a in accordance with the contour of each cam protrusion 23f.

Figure 12:
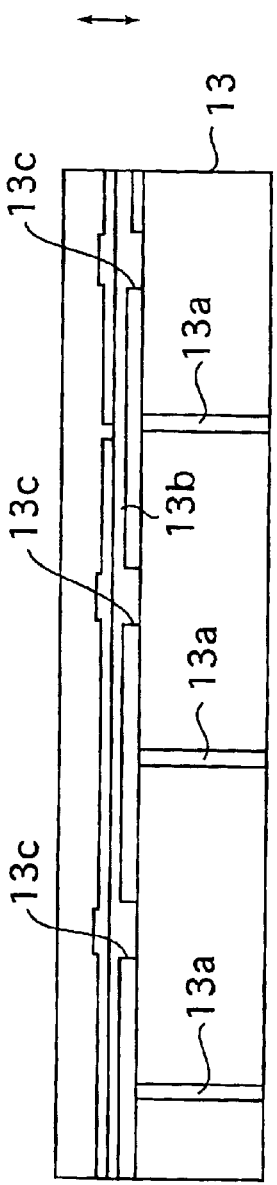
FIG. 12 is a developed view of an outer peripheral surface of a third lens frame provided as an element of the zoom lens barrel shown in FIGS. 1 and 2.
Figure 13:
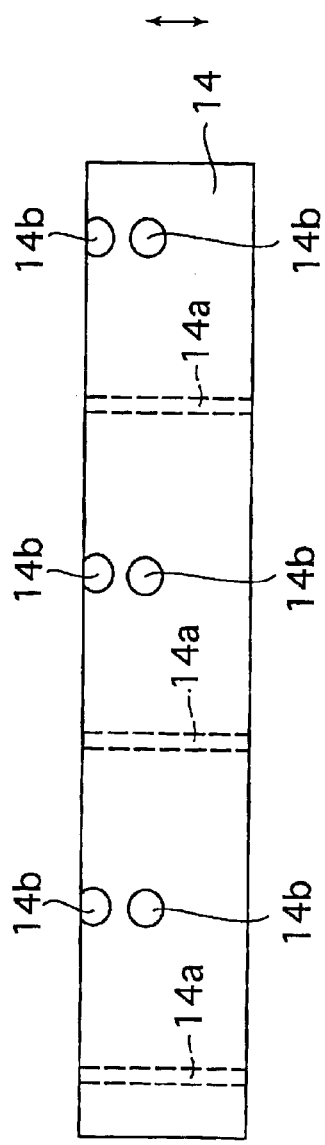
FIG. 13 is a developed view of an outer peripheral surface of a fourth lens frame provided as an element of the zoom lens barrel shown in FIGS. 1 and 2.
Figure 16:
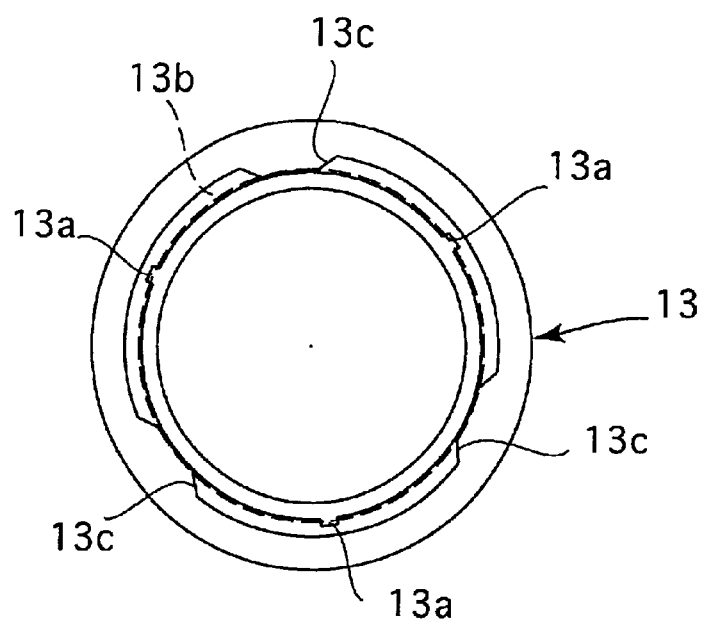
FIG. 16 is a rear elevational view of the third lens frame shown in FIG. 12.
Figure 17:
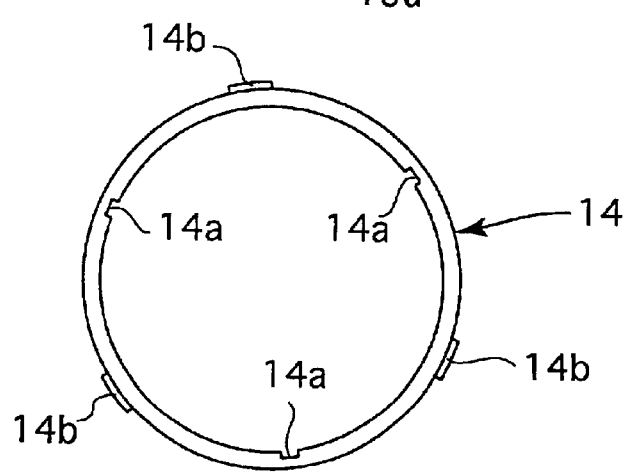
FIG. 17 is a rear elevational view of the fourth lens frame shown in FIG. 13.
Figure 18:
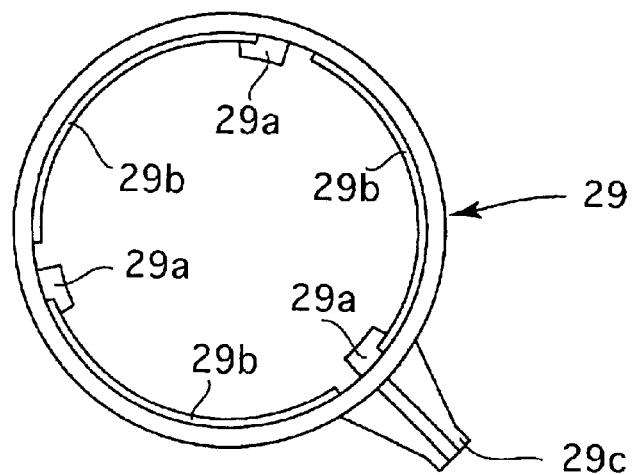
FIG. 18 is a rear elevational view of the second cam ring shown in FIG. 14.

The third lens frame 13 that supports the third lens group L3 is fixed to the third lens group moving frame 27 with a plurality of sector blades of an iris diaphragm (not shown) and a diaphragm drive ring 30 being held between the third lens frame 13 and an annular supporting portion 27b of the third lens group moving frame 27. The third lens frame 13 moves together with the third lens group moving frame 27 in the optical axis direction. As shown in FIGS. 12 and 16, the third lens frame 13 is provided on an outer peripheral surface thereof with a set of three linear guide elongated projections (linear guide projections) 13a which extend parallel to the optical axis O. The third lens frame 13 is further provided on an outer peripheral surface thereof with a circumferential groove (circumferential bottomed groove) 13b. The fourth lens frame 14 that supports the fourth lens group L4 is provided on an inner peripheral surface thereof with a set of three linear guide grooves (linear guide bottomed grooves) 14a (see FIGS. 13 and 17) in which the set of three linear guide elongated projections 13a of the third lens frame 13 are slidably engaged, respectively. With this structure, the fourth lens frame 14 is guided in the optical axis direction without rotating about the optical axis O relative to the third lens frame 13 due to the engagement of the three linear guide elongated projections 13a with the three linear guide grooves 14a.

Figure 14:
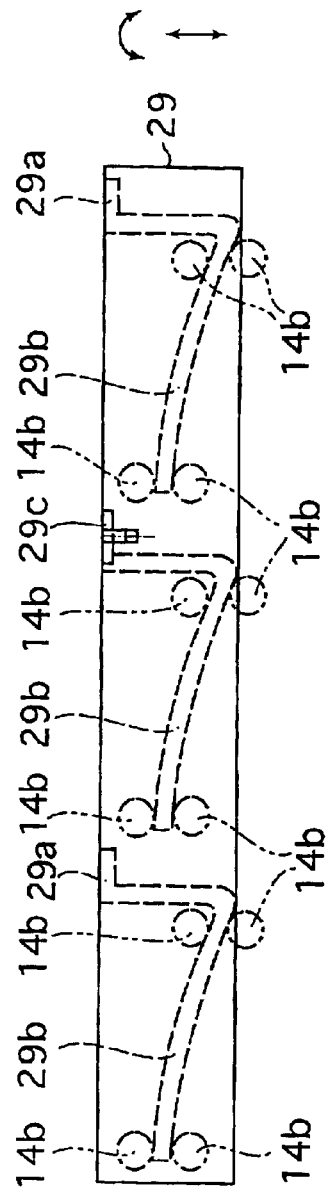
FIG. 14 is a developed view of an outer peripheral surface of a second cam ring provided as an element of the zoom lens barrel shown in FIGS. 1 and 2.

The zoom lens barrel 1 is provided on the third lens frame 13 with a second cam ring (rotating ring) 29 so that the second cam ring 29 can freely rotate about the optical axis O relative to the third lens frame 13. Specifically, as shown in FIG. 14, the second cam ring 29 is provided, on an inner peripheral surface at the front end thereof, with a set of three guide projections 29a which are slidably engaged in the circumferential groove 13b of the third lens frame 13. Therefore, the second cam ring 29 is rotatable about the optical axis O relative to the third lens frame 13, and moves together with the third lens frame 13 in the optical axis direction. The second cam ring 29 is provided on an inner peripheral surface thereof with a set of three rib-like cam protrusions (extending guide protrusions) 29b, each of which is slidably held between a corresponding pair of follower pins 14b formed on an outer peripheral surface of the fourth lens frame 14. With this structure, a rotation of the second cam ring 29 causes the fourth lens frame 14 to move in the optical axis direction.

When the third lens frame 13, the fourth lens frame 14, and the second cam ring 29 are put together during assembly, firstly the fourth lens frame 14 is fitted in the second cam ring 29 by inserting each of the three cam protrusions 29b into the gap between the corresponding pair of follower pins 14b. Secondly, this assembly consisting of the fourth lens frame 14 and the second cam ring 29 is brought into engagement with the third lens frame 13 by inserting the three guide projections 29a into the circumferential groove 13b via three insertion grooves 13c (see FIG. 12) which are communicatively connected with the circumferential groove 13b, and at the same time, by inserting the three linear guide elongated projections 13a into the three linear guide grooves 14a, respectively. After this insertion operation has been completed, the fourth lens frame 14 can be guided in the optical axis direction without rotating about the optical axis O by the third lens frame 13. If the second cam ring 29 is rotated by a predetermined amount of rotation so that the three guide projections 29a of the second cam ring 29 are respectively positioned away from the three insertion grooves 13c to be fitted in the circumferential groove 13b, each pair of follower pins 14b is engaged with an effective section of the corresponding cam protrusion 29b to be used for zooming. Although the third lens frame 13 and the second cam ring 29 rotate about the optical axis O relative to each other when zooming operation is carried out, the three guide projections 29a never move to positions (engaging/disengaging positions) on the circumferential groove 13b which adjoin the three insertion grooves 13c, respectively, during operation of the zoom lens barrel 1. Therefore, each guide projection 29a never comes out of the circumferential groove 13b during operation of the zoom lens barrel 1.

The second cam ring 29 is provided on an outer peripheral surface thereof with a rotational transfer arm 29c which extends radially outwards. The second cam ring drive lever 28, which is fixed to the rear end of the first cam ring 23, is engaged with the rotational transfer arm 29c to be rotatable together with the rotational transfer arm 29c about the optical axis O and to be movable in the optical axis direction relative to the rotational transfer arm 29c. Therefore, if rotation of the zoom ring 19 is transferred to the second cam ring 29 via the first cam ring 23 and the second cam lever 28 by rotating the zoom ring 19, the third lens group moving frame 27 moves together with the third lens frame 13 and the third lens group L3 in the optical axis direction due to the engagement of the three cam protrusions 23f with the three pairs of follower pins 27a, while the fourth lens frame 14 which supports the fourth lens group L4 moves in the optical axis direction due to the engagement of the three rib-like cam protrusions 29b with the three pairs of follower pins 14b, to thereby achieve the zoom path of each of the third and fourth lens groups L3 and L4.

The overall operation of the zoom lens barrel 1 will be hereinafter discussed with reference mainly to FIGS. 1, 2 and 19. The zoom ring 19 is manually turned when it is desired to perform zooming operation. Rotation of the zoom ring 19 causes the first cam ring 23 to rotate about the optical axis O. At this time, the first cam ring 23 moves in the optical axis direction while rotating about the optical axis O due to the engagement of the three lead protrusions 17b with the three pairs of follower projections 23a, i.e., due to a first extending guide mechanism (17b and 23a) positioned between the first cam ring 23 and the inner stationary barrel 17. According to the first effect of the zooming movement (a combination of rotational movement about the optical axis O and movement in the optical axis direction O) of the first cam ring 23, the second lens group moving frame 24 moves together with the first cam ring 23 in the optical axis direction. At this time, since the second lens group moving frame 24 does not rotate, a second extending guide mechanism which includes the three follower pins 24d and the three lead grooves (or the three cam grooves) 12b and which is positioned between the second lens frame 12 and the second lens group moving frame 24 does not function substantially. Consequently, the second lens frame 12 moves together with the second lens group moving frame 24 in the optical axis direction without rotating about the optical axis O. Moreover, according to the second effect of the zooming movement of the first cam ring 23, the first lens frame 11 moves in the optical axis direction in a predetermined zoom path due to a third extending guide mechanism which includes the three lead protrusions 23b and the three lead grooves 11a and which is positioned outside of the first cam ring 23. Furthermore, according to the third effect of movement of the first cam ring 23, the third lens frame 13 moves in the optical axis direction in a predetermined zoom path due to a fourth extending guide mechanism which includes the three cam protrusions 23f and the three pairs of follower pins 27a. Furthermore, according to the fourth effect of zooming movement of the first cam ring 23, rotation of the first cam ring 23 is transferred to the second cam ring 29, which causes the fourth lens frame 14 to move in the optical axis direction relative to the third lens frame 13 in a predetermined moving pattern due to a fifth extending guide mechanism which includes the three cam protrusions 29b and the three pairs of follower pins 14b and which is positioned between the second cam ring 29 and the fourth lens frame 14. Due to the above described structures, rotating the zoom ring 19 causes each of the first through fourth lens groups L1 through L4 to move along the optical axis O in a predetermined moving pattern to thereby vary the focal length of the zoom lens barrel 1. Accordingly, in FIG. 19, each element shown above a one-dot chain line is a fundamental element of a drive system for the zooming operation.

A focusing operation is carried out by rotating either the focusing ring 18 or the AF coupler 20. If the focusing lever 22 rotates about the optical axis O by rotation of the focusing ring 18 or the AF coupler 20, the second lens frame 12 rotates about the optical axis O. This causes the second lens frame 12 to move in the optical axis direction while rotating about the optical axis O relative to the second lens group moving frame 24 to bring an object into focus due to the engagement of the aforementioned second extending guide mechanism (24d and 12b) that is positioned between the second lens frame 12 and the second lens group moving frame 24. Accordingly, each element shown below the one-dot chain line shown in FIG. 19 and the second extending guide mechanism (24d and 12b) positioned between the second lens frame 12 and the second lens group moving frame 24 are fundamental elements of a drive system for the focusing operation.

A feature of the zoom lens barrel 1 is that the first lens frame 11 which supports the first lens group L1, the second lens frame 12 and the second lens group moving frame 24 which support the second lens group L2, and the third lens frame 13 and the third lens group moving frame 27 which support the third lens group L3, are driven to move in the optical axis direction by a movement of a common lens drive ring, i.e., the first cam ring 23. Namely, each of the first, second and third lens groups L1, L2 and L3 is driven to move in the optical axis direction directly by a movement of the first cam ring 23 without any other drive members. This simplifies the overall structure of the lens drive mechanism of the zoom lens barrel 1.

Firstly, in regard to the second lens group L2, the first cam ring 23 moves in the optical axis direction while rotating about the optical axis O when zooming operation is carried out. The zoom lens barrel 1 is designed so that the amount of such movement of the first cam ring 23 corresponds to the amount of movement of the second lens group L2. As specifically described above, the first cam ring 23 moves in the optical axis direction while rotating about the optical axis O due to the engagement of the three lead protrusions 17b with the three pairs of follower projections 23a. Each pair of follower projections 23a are positioned on opposite sides of the corresponding lead protrusion 17b to make sliding contact with the opposite sides of the corresponding lead protrusion 17b, respectively. On the other hand, the second lens group moving frame 24 that supports the second lens group L2 is guided in the optical axis direction via the inner stationary barrel 17. The second lens group moving frame 24 is engaged with the first cam ring 23 to be rotatable about the optical axis O relative to the first cam ring 23 and to be immovable in the optical axis direction relative to the first cam ring 23, with the three guide projections 23c of the first cam ring 23 being engaged in the circumferential groove 24c.

In the present embodiment of the zoom lens barrel 1, since a focusing operation is carried out by moving only the second lens group L2 from among the first through fourth lens groups L1 through L4, the second lens group L2 is directly supported by the second lens frame 12, while the second lens frame 12 is supported to move in the optical axis direction by relative rotation with respect to the second lens group moving frame 24. However, although the second lens frame 12 and the second lens group moving frame 24 move relative to each other in the optical axis direction when focusing operation is carried out, the second lens frame 12 and the second lens group moving frame 24 move together in the optical axis direction when zooming operation is carried out. Accordingly, considering the second lens frame 12 and the second lens group moving frame 24 as a driving system for zooming operation, the second lens frame 12 and the second lens group moving frame 24 can be substantially regarded as a single lens supporting ring.

Therefore, if a rotation of the zoom ring 19 is transferred to the first cam ring 23 via the zoom lever 26 and the rotational transfer recess 23d, the first cam ring 23 moves in the optical axis direction while rotating about the optical axis O, which in turn moves the second lens group moving frame 24 in the optical axis direction by the same amount of movement. Accordingly, the first cam ring 23 has a function to determine the axial position to which the second lens group L2 is to move by moving in the optical axis direction relative to the outer and inner stationary barrels 16 and 17 without moving in the optical axis direction relative to the second lens group moving frame 24.

Moreover, the first cam ring 23 can make the first lens frame 11 move in the optical axis direction relative to the first cam ring 23 due to the engagement of the three lead protrusions 23b, which are formed on an outer peripheral surface of the first cam ring 23, with the three lead grooves 11a, which are formed on an inner peripheral surface of the first lens frame 11, when the first cam ring 23 rotates. Accordingly, the first cam ring 23 has a function to directly determine the axial position to which the first lens group L1 moves.

Furthermore, the first cam ring 23 has a function to give a zooming operation movement (zoom path) to the third lens group L3 due to the engagement of the three rib-like cam protrusions 23f, which are formed on an inner peripheral surface of the first cam ring 23, with the three pairs of follower pins 27a, which are formed on an outer peripheral surface of the third lens group moving frame 27, when the first cam ring 23 is rotated. Since the third lens group moving frame 27 and the third lens frame 13 that supports the third lens group L3 can be regarded as a substantial single lens support ring, the first cam ring 23 has a function to directly determine the axial position to which the third lens group L3 moves.

Accordingly, the first cam ring 23 provides a complex function to give a zoom path to each of the first, second and third lens groups L1, L2 and L3 without any intermediate rotating members. Driving each of the three lens groups L1, L2 and L3 via a single lens drive ring (i.e., the first cam ring 23) makes it possible to simplify the structure of the lens drive mechanism of the zoom lens barrel 1, to thereby reduce the number of elements of the lens drive mechanism of the zoom lens barrel 1. This in turn makes it possible to further miniaturize the zoom lens barrel 1, to reduce the cost of production thereof, and to reduce causes (e.g., backlash and play) of deterioration in the degree of positional accuracy of each lens element.

Furthermore, a rotation of the first cam ring 23 causes the second cam ring 29 to rotate via the second cam ring drive lever 28 which is fixed at the rear end of the first cam ring 23. The second cam ring 29 is supported by the third lens group moving frame 27 (via the third lens frame 13) to be rotatable about the optical axis O relative to the third lens group moving frame 27. A rotation of the second cam ring 29 causes the fourth lens frame 14 to move in the optical axis direction relative to the third lens frame 13. Accordingly, the first lens frame 23 has a function to indirectly move the fourth lens group L4 in the optical axis direction.

Figure 20:
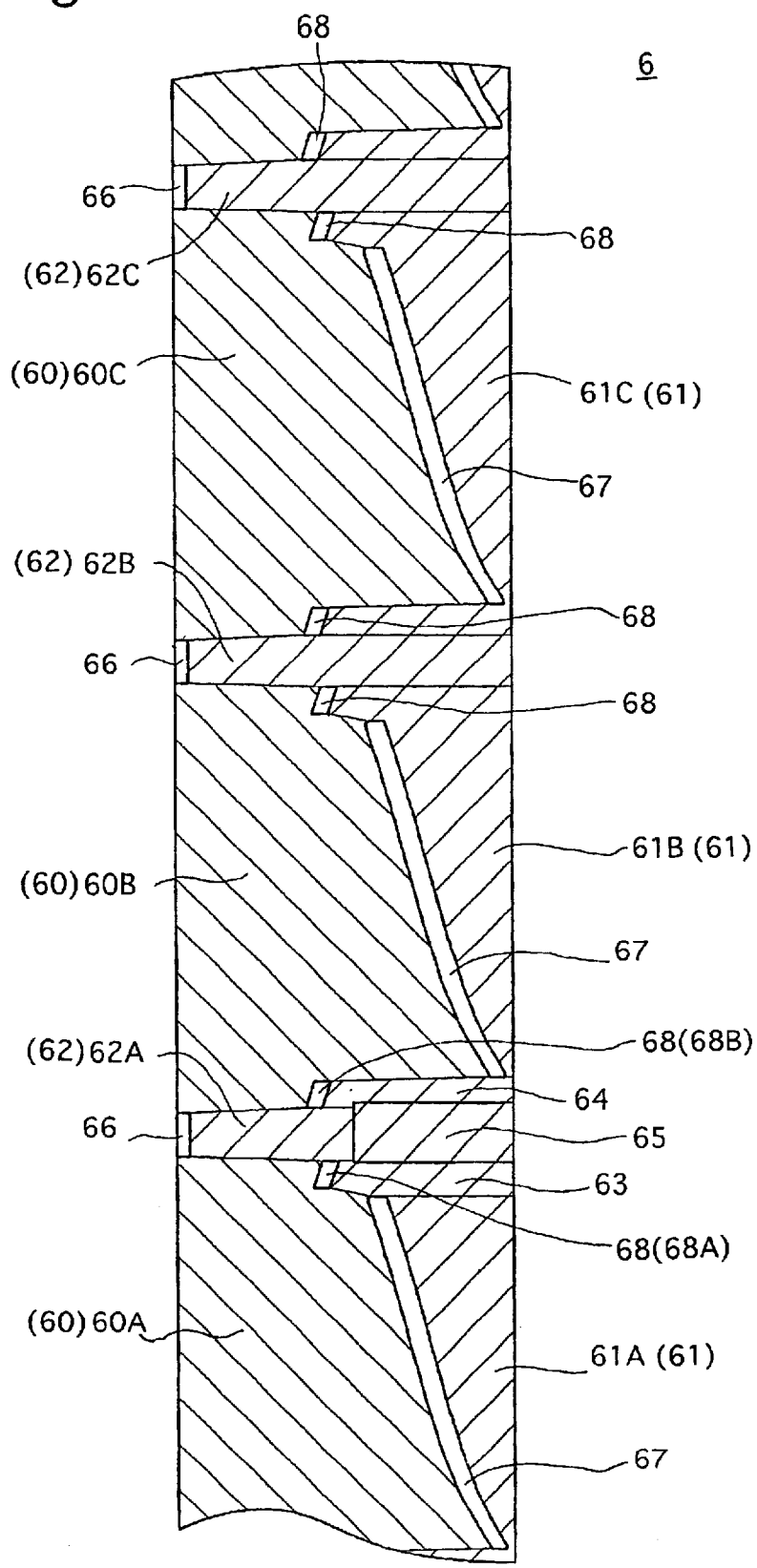
FIG. 20 is a developed view of an inner peripheral surface of an example of a mold used for molding the first cam ring of the zoom lens barrel shown in FIGS. 1 and 2.

The first cam ring 23 having the above described complex function can be molded of synthetic resin to reduce the cost of production. FIG. 20 shows an example of a mold for molding the first cam ring 23. The mold 6 shown in FIG. 20 is used to form the complicated configuration of the inner peripheral surface of the first cam ring 23. Another mold (not shown) is used to form the configuration of the outer peripheral surface of the first cam ring 23, and will be discussed later but will not be discussed in detail for the sake of simplicity because the configuration of the outer peripheral surface of the first cam ring 23 is simple.

The mold 6 consists of twelve segments. More specifically, the mold 6 is provided with three first segments 60 (60A, 60B and 60C), three second segments 61 (61A, 61B and 61C), three third segments 62 (62A, 62B and 62C), a fourth segment 63, a fifth segment 64 and a sixth segment 65. Each first segment 60 that is greater than any other segments of the mold 6 is used to form a front part of the inner peripheral surface. Each second segment 61 is used to form a rear part of the inner peripheral surface. The three third segments 62 are arranged at regular intervals about an axis of the mold 6. Two of the three third segments 62B and 62C have the same shape and size, while the remaining segment 62A is formed to be shorter than the other two segments 62B and 62C in the forward/rearward direction (the horizontal direction as viewed in FIG. 20). The fourth and fifth segments 63 and 64 are positioned on opposite sides of the segment 62A in a circumferential direction of the mold 6, while the sixth segment 65 is positioned immediately behind the segment 62A to be held between the fourth and fifth segments 63 and 64. The shapes of the three second segments 61A, 61B and 61C are slightly different from one another because of the presence of the fourth and fifth segments 63 and 64.

Each of the third segments 62 is provided at the front end thereof with a recess 66 for forming the corresponding guide projection 23c of the fist cam ring 23. The three rib-like cam protrusions 23f of the first cam ring 23 are formed by three elongated recesses 67, respectively. One of the three elongated recesses 67 (the upper elongated recess as viewed in FIG. 20) is formed between the first segment 60C and the second segment 61C. Another of the three elongated recesses 67 (the middle elongated recess as viewed in FIG. 20) is formed among the first segment 60B, the second segment 61B and the fifth segment 64. The remaining one of the three elongated recesses 67 (the lower elongated recess as viewed in FIG. 20) is formed among the first segment 60A, the second segment 61A and the fifth segment 63. The three pairs of follower projections 23a are formed by three pairs of oblique recesses 68, respectively. One pair of the three pairs of oblique recesses 68 (the upper pair as viewed in FIG. 20) are formed among the first segment 60 (60A and 60C), the second segment 61(61A and 61C) and the third segment 62C. Another pair of the three pairs of oblique recesses 68 (the middle pair as viewed in FIG. 20) are formed among the first segment 60 (60B and 60C), the second segment 61 (61B and 61C) and the third segment 62B. The remaining pair of the three pairs of oblique recesses 68 (the lower pair as viewed in FIG. 20) has a first oblique recess 68A and a second oblique recess 68B, wherein the first oblique recess 68A is formed among the first segment 60A, the second segment 61A and the fourth segment 63 while the second oblique recess 68B is formed among the first segment 60B, the second segment 61B and the fifth segment 64. The sixth segment 65 is used to form the rotational transfer recess 23d of the first cam ring 23.

The mold (not shown) which is used to form the configuration of the outer peripheral surface of the first cam ring 23 consists of three segments so that each of the three rib-like lead protrusions 23b is formed between associated two of the three segments. This mold (outer mold) is set around the mold 6 (inner mold) so that a predetermined annular gap which corresponds to the thickness of the first cam ring 23 is formed between the outer and inner molds. A liquefied synthetic resin is injected in the annular gap to mold the first cam ring 23. Burrs are removed from the molded piece to obtain the first cam ring 23 as shown in FIG. 9. The second cam ring drive lever 28 is fixed to the rear end of the first cam ring 23 by, e.g., a set screw or an adhesive. In the first cam ring 23 which is made in the above described manner, the rotational transfer recess 23d is the only recess formed thereon, so that any other part of the outer and inner peripheral surfaces of the first cam ring 23 is provided as a mere part of a cylindrical surface or as a protrusion. Accordingly, the first cam ring 23 is formed as a solid annular member having no radial through holes. An annular member is preferably formed with no radial through holes so as not to deteriorate the dimensional accuracy and the strength of the annular member. Specifically in the present embodiment of the zoom lens barrel, the dimensional accuracy of the first cam ring 23 has an influence directly on the accuracy in position of all the first through fourth lens groups L1 through L4. Therefore, the first cam ring 23 is desirably formed with no radial through holes.

Aside from features of the first cam ring 23, the zoom lens barrel 1 is characterized in that linear guide portions for guiding each of the first through fourth lens frames 11, 12, 13 and 14 are formed on only the inner stationary barrel 17 and each of the first through fourth lens frames 11, 12, 13 and 14. Namely, the zoom lens barrel 1 is not provided with any members serving solely as a linear guide member. Specifically, the inner stationary barrel 17 is provided with the three linear guide grooves 17c and the three through slots 17f with which the three linear guide elongated projections 24a and the three pairs of follower pins 27a of the third lens group moving frame 27 are engaged, respectively. With this structure, the second lens group moving frame 24 and the third lens group moving frame 27 are guided linearly in the optical axis direction via the inner stationary barrel 17. As for the first lens group moving frame 11, the three linear guide grooves 11b are engaged with the three linear guide elongated projections 24b of the second lens group moving frame 24 so that the first lens group moving frame 11 is guided linearly in the optical axis direction by the inner stationary barrel 17 via the second lens group moving frame 24. In addition, the fourth lens frame 14 is guided linearly in the optical axis direction due to the engagement of the three linear guide grooves 14a with the three linear guide elongated projections 13a via the third lens frame 13.

In the present embodiment of the zoom lens barrel 1, when zooming operation is carried out, the zoom ring 19 is manually turned to rotate the first cam ring 23 in accordance with the rotation of the zoom ring 19. This rotation of the first cam ring 23 causes each of the first through fourth lens groups L1 through L4 to move in the optical axis direction in a predetermined moving manner (zoom path) while varying respective distances between the lens groups L1 through L4. Specifically the third and fourth lens groups L3 and L4 vary the distance therebetween to correct aberrations at each focal length. Each of the third and fourth lens groups L3 and L4 is sensitive to a deviation from the original position, so that the optical performance of the zoom lens barrel 1 greatly deteriorates if tilt, eccentricity and/or an axial positional deviation occurs on the third and fourth lens groups L3 and L4. Therefore, the mechanism for supporting and driving the third and fourth lens groups L3 and L4 is required to be designed and constructed with great precision. Accordingly, in the present embodiment of the zoom lens barrel 1, the mechanism for moving the third and fourth lens groups L3 and L4 relative to each other is structured so as to have little influence on the accuracy in position of the lens groups L3 and L4 and the optical performance of the zoom lens barrel 1. This structure will be hereinafter discussed in detail.

Each of the third lens frame 13, the fourth lens frame 14, and the second cam ring 29, which are associated with the driving of the third and fourth lens groups L3 and L4 relative to each other, is formed as a solid annular member with no radial through holes. Specifically, the third and fourth lens groups L3 and L4 are moved in the optical axis direction relative to each other by rotation of the second cam ring 29; the cam mechanism (the fifth extending guide mechanism) which generates this relative movement between the third and fourth lens groups L3 and L4 includes the three rib-like cam protrusions 29b, which are formed integral with the inner peripheral surface of the second cam ring 29, and the three pairs of follower pins 14b, which are formed integral with the outer peripheral surface of the fourth lens frame 14. On the other hand, the fourth lens frame 14 is guided in the optical axis direction via the third lens group 13; the linear guide mechanism which guides the fourth lens frame 14 in the optical axis direction includes the three linear guide elongated projections 13a, which are formed integral with the outer peripheral surface of the third lens frame 13, and the three linear guide grooves 14a, which are formed integral with the inner peripheral surface of the fourth lens frame 14. Accordingly, the third lens frame 13 and the second cam ring 29 are arranged inside and outside of the fourth lens frame 14, respectively, with the fourth lens frame 14 being held between the third lens frame 13 and the second cam ring 29, while all the fundamental elements of the cam mechanism (the fifth extending guide mechanism) provided between the fourth lens frame 14 and the second cam ring 29 are formed as protrusions or projections. This construction does not require to form each of the third lens frame 13, the fourth lens frame 14 and the second cam ring 29 as an annular member with radial through holes. In addition, since the engaging device which connects the third lens frame 13 with the second cam ring 29 in a rotatable fashion about the optical axis O relative to each other includes the bottomed circumferential groove 13b of the third lens frame 13 and the guide projections 29a of the second cam ring 29, neither the third lens frame 13 nor the second cam ring 29 does not have to be formed as a ring member with radial through holes.

In the present embodiment of the zoom lens barrel 1, although made of synthetic resin, each of the third lens frame 13, the fourth lens frame 14 and the second cam ring 29 is not easily deformed during the process of molding. This improves the dimensional accuracy and the strength of each of the third lens frame 13, the fourth lens frame 14 and the second cam ring 29. In other words, tilt, eccentricity and/or an axial positional deviation of third and fourth lens groups L3 and L4 can easily be prevented from occurring without making the third lens frame 13, the fourth lens frame 14, or the second cam ring 29 using a costly material such as metal. Moreover, since no radial through holes are formed on any of the third lens frame 13, the fourth lens frame 14, or the second cam ring 29, no stray light passes through the wall of the third lens frame 13, the fourth lens frame 14, or the second cam ring 29, and no foreign particles enter inside. This prevents the optical performance of the zoom lens barrel 1 from deteriorating.

Additionally, as for the cam mechanism (the fifth extending guide mechanism) which includes the three cam protrusions 29b and the three pairs of follower pins 14b, this cam mechanism is not provided with any radial through holes or even bottomed grooves, which contributes much to improvement in the accuracy in position of the third and fourth lens groups L3 and L4. Specifically, both the fourth lens frame 14 and the second cam ring 29 are engaged with each other via respective radial projections, i.e., the three pairs of follower pins 14b and the three cam protrusions 29b, and do not have any bottomed cam grooves or the like. Rib-like cam protrusions, such as the cam protrusions 29b, formed on an annular member do not easily become a cause of deformation of the annular member as compared with a case where cam grooves are formed on an annular member, and are thus advantageous for the improvement in the accuracy in dimensions of molded products and the strength thereof. Moreover, since the three pairs of follower pins 14b and the three cam protrusions 29b are projections, not grooves, a mold disassembling operation can be easily carried out, since the fourth lens frame 14 can be formed integrally with the three pairs of follower pins 14b and the second cam ring 29 can be formed integrally with the three cam protrusions 29b. This contributes to a reduction in the cost of production, as compared with a conventional structure wherein follower pins which are respectively engaged in cam grooves of a cam ring are formed separately from a lens support ring.

As for the cam protrusions 29b, it is not necessary to form each cam protrusion 29b to have a tapered surface which is formerly necessary for removal of an associated mold. This makes it easy to prevent play or a gap from occurring at the point of engagement between each pair of follower pins 14b and the corresponding cam protrusion 29b. Specifically, each cam protrusion 29b is formed like an elongated protrusion or rib which extends inwards from the inner peripheral surface of the second cam ring 29 to have a rectangular shape in cross section, while two cam surfaces (guide surfaces) formed on opposite sides of each cam protrusion 29b extends substantially parallel to a radial direction of the second cam ring 29. On the other hand, each pin of each pair of follower pins 14b that holds the corresponding cam protrusion 29b therebetween is formed as a cylinder extending outwards in a substantially radial direction of the fourth lens frame 14 with the axis of the cylinder extending parallel to each of the two cam surfaces of the associated cam protrusion 29b. Therefore, each of the opposite two cam surfaces of each cam protrusion 29b comes into linear contact with the corresponding follower pin 14b along a line extending substantially in a radial direction of the fourth lens frame 14. This structure makes play or deviation of each pair of follower pins 14b in a direction perpendicular to a plane including the axes of the pair of follower pins 14b difficult to occur, which makes it possible to guide the fourth lens group L4 in the optical axis direction with precision. Moreover, because a gap between each cam protrusion 29b and the corresponding pair of follower pins 14b is not easily produced, the chances of harmful rays entering through the gap are minimized.

The rotational transfer mechanism for transferring a rotation of the first cam ring 23 to the second cam ring 29 includes the second cam ring drive lever 28 and the rotational transfer arm 29c. Therefore, the rotational transfer mechanism is not provided with any radial through holes either.

As can be understood from the above descriptions, according to the present embodiment of the zoom lens barrel, each of the third lens frame 13, the fourth lens frame 14 and the second cam ring 29, which are related to the support for the third and fourth lens groups L3 and L4 and the relative movement between the third and fourth lens groups L3 and L4, is provided with no radial through holes, a high degree of positional accuracy and a high strength of each of the third lens frame 13, the fourth lens frame 14 and the second cam ring 29 are achieved, and at the same time, each of the third and fourth lens groups L3 and L4, which is sensitive to tilt, eccentricity and/or axial positional deviation thereof, can be precisely positioned at all times. Moreover, harmful rays and foreign particles can effectively be prevented from entering into an optical path of the zoom lens optical system of the zoom lens barrel 1, since no radial through holes are formed at or in the vicinity of either the fifth extending guide mechanism, which includes the three cam protrusions 29b and the three pairs of follower pins 14b, or the linear guide mechanism, which includes the three linear guide elongated projections 13a and the three linear guide grooves 14a. As a consequence, a sufficient degree of accuracy in position of the third and fourth lens groups L3 and L4 and also a sufficient optical performance thereof can be achieved while reducing the cost of production of the third lens frame 13, the fourth lens frame 14 and the second cam ring 29.

Furthermore, the three linear guide elongated projections 13a, the three linear guide grooves 14a, the three pairs of follower pins 14b and the three cam protrusions 29b, which are fundamental elements of the linear guide mechanism (13a and 14a) and the fifth extending guide mechanism (14b and 29b), can be easily formed on the third lens frame 13, the fourth lens frame 14 and the second cam ring 29, respectively. Accordingly, the three linear guide elongated projections 13a, the three linear guide grooves 14a, the three pairs of follower pins 14b, and the three cam protrusions 29b can be formed integral with the third lens frame 13, the fourth lens frame 14 and the second cam ring 29, respectively, to reduce the cost of production.

Although the three elongated rib-like cam protrusions 29b are formed on a rotating ring (the second cam ring 29) while the three pairs of follower pins 14b, which are respectively in sliding contact with the three cam protrusions 29b, are formed on a lens support ring (the fourth lens frame 14) in the present embodiment of the zoom lens barrel, the elongated rib-like cam protrusions corresponding to the three cam protrusions 29b can be formed on the lens support ring while the pairs of follower pins corresponding to the three pairs of follower pins 14b can be formed on the rotating ring.

Although each pair of follower pins 14b holds the corresponding elongated rib-like cam protrusion 29b therebetween in the present embodiment of the zoom lens barrel, only a single follower pin formed on the fourth lens frame 14 instead of a pair of follower pins can be brought into sliding contact with the corresponding elongated rib-like cam protrusion 29b with an appropriate device which keeps the single follower pin in sliding contact with the elongated rib-like cam protrusion 14b.

Although cam protrusions each having a non-linear contour are formed on each of the first cam ring 23 and the second cam ring 29, such cam protrusions can be replaced by lead protrusions each having a linear contour.

In short, no through holes have to be formed on any elements of a structure with which a lens support ring is driven to move in the optical axis direction by rotation of a rotating ring.

As can be understood from FIGS. 1 and 2, in the present embodiment of the zoom lens barrel, the zoom lens barrel 1 is designed so that the first cam ring 23 moves in the optical axis direction while rotating about the optical axis O when zooming operation is carried out, and so that the second lens group L2 moves in the optical axis direction by the same amount of movement as the amount of movement of the first cam ring 23.

Concretely, the second lens group moving frame 24 that supports the second lens group L2 via second lens flame 12 is guided in the optical axis direction via the inner stationary barrel 17 without rotating about the optical axis O. The second lens group moving frame 24 is coupled to the first cam ring 23 to be rotatable about the optical axis O relative to the first cam ring 23, and to be immovable in the optical axis direction relative to the first cam ring 23 with the three guide projections 23c being engaged in the circumferential groove 24c that is formed in the vicinity of the front end of the second lens frame 24. Therefore, the amount of movement of the first cam ring 23 in the optical axis direction corresponds to the amount of movement of the second lens group L2 in the optical axis direction. Owing to this structure, it is substantially unnecessary to consider deviation of the second lens group L2 relative to the first cam ring 23 in the optical axis direction. Since the first cam ring 23 and the second lens group moving frame 24 are coupled to each other via a bayonet coupling device composed of the three guide projections 23c and the circumferential groove 24c, the coupling structure of the first cam ring 23 and the second lens group moving frame 24 is simple, and allows negligible deviation to occur between the first cam ring 23 and the second lens group moving frame 24 at worst, especially in the optical axis direction. In addition, since this coupling structure can be easily obtained even if each of the first cam ring 23 and the second lens group moving frame 24 is molded of synthetic resin, the cost of production can be reduced.

As has been noted above, considering that the second lens frame 12 and the second lens group moving frame 24 is a driving system for zooming operation, the second lens frame 12 and the second lens group moving frame 24 can be regarded as a substantial single lens supporting ring, which moves in the optical axis direction together with the first cam ring 23.

The first extending guide mechanism for moving the first cam ring 23 in the optical axis direction includes the three lead protrusions 17b, which are formed on the outer peripheral surface of the inner stationary barrel 17, and the three pairs of follower projections 23a, which are formed on the inner peripheral surface of the first cam ring 23. Each pair of follower projections 23a slidably holds the corresponding lead protrusion 17b therebetween. The first extending guide mechanism is somewhat similar to a coupling structure using helicoidal threads, and therefore has less play than a conventional mechanism for moving an annular member in an optical axis direction with followers being engaged in cam grooves or lead grooves, and is also superior to such a conventional mechanism in accuracy of coupling. Accordingly, a high positional accuracy for the first cam ring 23 can be maintained. Moreover, since the first extending guide mechanism includes only protrusions or projections (the three lead protrusions 17b and the three pairs of follower projections 23a), the strength of each of the inner stationary barrel 17 and the first cam ring 23 does not deteriorate even if the inner stationary barrel 17 and the first cam ring 23 are made as molded parts; the three lead protrusions 17b and the three pairs of follower projections 23a rather reinforce the inner stationary barrel 17 and the first cam ring 23, respectively. Such protrusions and projections 17b and 23a can be easily formed integral with major parts of the inner stationary barrel 17 and the first cam ring 23. In other words, a sufficient strength of each of the inner stationary barrel 17 and the first cam ring 23 is ensured even if each of the inner stationary barrel 17 and the first cam ring 23 is molded out of synthetic resin to reduce the cost of production.

Accordingly, as for the mechanism for moving the second lens group L2 in the optical axis direction, the structure of the mechanism is simple; and furthermore, each element of the mechanism can be molded of synthetic resin, which makes it possible to reduce the cost of production while ensuring a sufficient strength of the mechanism.

In the present embodiment of the zoom lens barrel, as can be seen in FIGS. 1 and 2, the amount of movement of the first lens group L1 in the optical axis direction between the wide-angle extremity and the telephoto extremity of the first lens group L1 exceeds the amount of movement of the first cam ring 23 in the optical axis direction. The first lens frame 11 that supports the first lens group L1 is moved in the optical axis direction relative to the first cam ring 23 directly by rotation of the first cam ring 23 due to the third extending guide mechanism, i.e., due to the engagement of the three lead grooves 11a, which are formed on the inner peripheral surface of the first lens frame 11, with the three lead protrusions 23b, which are formed on the outer peripheral surface of the first cam ring 23. However, the amount of the relative movement of the first lens frame 11 and the first cam ring 23 becomes equal to the length of the first cam ring 23 at maximum, i.e., the relative movement of the first lens frame 11 and the first cam ring 23 cannot be greater than the length of the first cam ring 23. For instance, as shown in FIG. 9, the three rib-like lead protrusions 23b are formed to extend almost entirely across the first cam ring 23 in the optical axis direction (the vertical direction as viewed in FIG. 9), so that the maximum amount of movement of the first lens frame 11 in the optical axis direction relative to the first cam ring 23 nearly corresponds to the length of the first cam ring 23.

In addition, since the first cam ring 23 itself moves in the optical axis direction via the above described structure, the amount of movement of the first lens frame 11 relative to any stationary portion of the zoom lens barrel 1 (e.g., the inner stationary barrel 17), in the optical axis direction, corresponds to a sum of the amount of movement of the first lens frame 11 due to the engagement of the three lead grooves 11a with the three lead protrusions 23b (i.e., the third extending guide mechanism) and the amount of movement of the first cam ring 23 itself. Accordingly, the first lens group L1 can move in the optical axis direction by an amount of movement greater than the length of the first cam ring 23.

For instance, supposing that the first cam ring 23 were to be a rotating member which is immovable in the optical axis direction and stationary at the wide-angle extremity thereof, unlike the present invention, the frontmost position of the first lens group L1 when the zoom lens barrel 1 is fully extended will be closer to the camera body 40 than the front most position of the first lens group L1 shown in FIG. 1. This requires at least an additional lens extending mechanism if the first lens group L1 needs to further move forward up to the position of the first lens group L1 shown in FIG. 1. This would increase the size of the zoom lens barrel and would complicate the structure thereof. If the number of elements of the zoom lens barrel increases, the cost of production increases accordingly; and furthermore, the optical performance of the zoom lens barrel cannot be easily maintained. Conversely, if the aforementioned cam ring is designed to have a longer length, a sufficient amount of movement of the first lens group L1 would be secured. However, the length of the cam ring cannot be extended largely because only a small amount of space exits at either of front and back of the first cam ring 23 when the focal length is set to the wide-angle extremity. In other words, if the cam ring is lengthened, the cam ring may be interfere with other elements. In short, according to the present embodiment of the zoom lens barrel, the first cam ring 23 can be miniaturized to maintain the space-saving third extending guide mechanism while ensuring a sufficient amount of movement of the first lens group L1 without increasing the cost of production.

In the present embodiment of the zoom lens barrel, since the maximum amount of movement of the first lens group L1 is greater than the length of the first cam ring 23, the adoption of the above described structure moving the first cam ring 23 itself is particularly effective. However, with regard also to the third lens group L3 (and the fourth lens group L4), whose maximum amount of movement is smaller than that of the first lens group, an amount of movement greater than the effective length of the contour of each cam protrusion 23f that directly determines the moving pattern of the third lens group L3 (and the fourth lens group L4) can be give to the third lens group L3 (and the fourth lens group L4) by movement of the first cam ring 23. Namely, even if the pitch of the cam or lead protrusions needs to be smaller due to lack of space, the actual amount movement of the third lens group L3 (and the fourth lens group L4) can be made greater due to a feature of the present invention in which the first cam ring (rotating ring) 23 itself moves forward and rearward in the optical axis direction.

In the present embodiment of the zoom lens barrel, the first lens frame 11 is guided linearly in the optical axis direction via the second lens group moving frame 24 which supports the second lens group L2 via the second lens frame 12, and the zoom lens barrel 1 is provided with no independent linear guide ring used solely for guiding the first lens frame 11 linearly in the optical axis direction. The absence of an independent linear guide ring contributes to the reduction of the number of elements of the zoom lens barrel 1 and also to simplification of the structure thereof. As shown in FIG. 8, the second lens group moving frame 24 is provided with the three linear guide elongated projections 24a for linearly guiding the second lens group moving frame 24 itself in the optical axis direction, and is further provided, in front of the three linear guide elongated projections 24a beyond the circumferential groove 24c, with the three linear guide elongated projections 24b for linearly guiding the first lens frame 11 in the optical axis direction. The three linear guide elongated projections 24a and the three linear guide elongated projections 24b are formed at the same positions on the outer peripheral surface in a circumferential direction of the second lens group moving frame 24, respectively. In other words, as for the second lens group moving frame 24, three guide projections (24a) and another three guide projections (24b) having respective functions are correspondingly arranged in the axial direction of the second lens group moving frame 24. This structure contributes to the simplification of the mold for molding the second lens group moving frame 24, and also to reduction in the cost of production. Moreover, such a structure reinforces the second lens group moving frame 24.

Although the three linear guide elongated projections 24a and the three linear guide elongated projections 24b are engaged in the three linear guide grooves 17c and the three linear guide grooves 11b, respectively, these linear guide grooves 17c and 11b do not greatly weaken the strength of the inner stationary barrel 17 and the first lens frame 11, respectively, since each of the grooves 17c and 11b is formed as a bottomed groove, not a through slot. This structure is superior to a structure using radial through slots or holes serving as linear guide portions, in regard to accuracy of molding, strength and light shield properties. In addition, since the first extending guide mechanism for moving the second lens group L2 in the optical axis direction is made of a combination of projections (i.e., a combination of the three lead protrusions 17b and the three pairs of follower projections 23a) and further since the third extending guide mechanism (leading mechanism) for moving the first lens group L1 in the optical axis direction is made from a combination of bottomed grooves (the three lead grooves 11a) and projections (the rib-like lead protrusions 23b), the mechanism for making the first and second lens groups L1 and L2 move along a zoom path requires no radial through holes (except for the circumferential through slot 17a and the elongated through hole 17d because these are used for making the first and second lens groups L1 and L2 move for focusing operation). This structure of the mechanism for zooming which adopts no through holes improves the accuracy of molding and the strength of each associated element of the zoom lens barrel 1, and also prevents harmful rays and foreign particles from entering an optical path of the zoom lens optical system of the zoom lens barrel 1. In other words, in the case where elements of the zoom lens barrel 1, which are associated with the movement of each of the first and second lens groups L1 and L2 for a zooming operation, are each made as a molded part, sufficient accuracy, strength and optical performance are secured.

The zoom lens barrel 1 is provided with a driving force transfer mechanism for transferring a driving force generated by an electric drive mechanism including the AF coupler 20 to the second lens group L2 (which serves as a focusing lens group) and also for transferring a driving force generated by rotation of the focusing ring 18 that is supported by the outer stationary barrel 16 to the second lens group L2. One of the features of the zoom lens barrel 1 is found in this driving force transfer mechanism. Specifically, this feature is that the focusing lever 22 (a coupling lever) and the focusing gear 21 (an annular gear having the center thereof on the optical axis O) are arranged separately between the focusing ring 18 (a hand-operated ring) and the aforementioned electric drive mechanism, and that the focusing gear 21 and the focusing ring 18 are linked to each other via the focusing lever 22 to be integral with each other in at least a circumferential direction about the optical axis so as to be rotatable together about the optical axis O. Although the structure of the driving force transfer mechanism has been described specifically in connection with the structures of other mechanisms, the advantage of the driving force transfer mechanism will be hereinafter discussed with reference to a structure of a comparative example of a lens barrel shown in FIG. 21.

Figure 21:
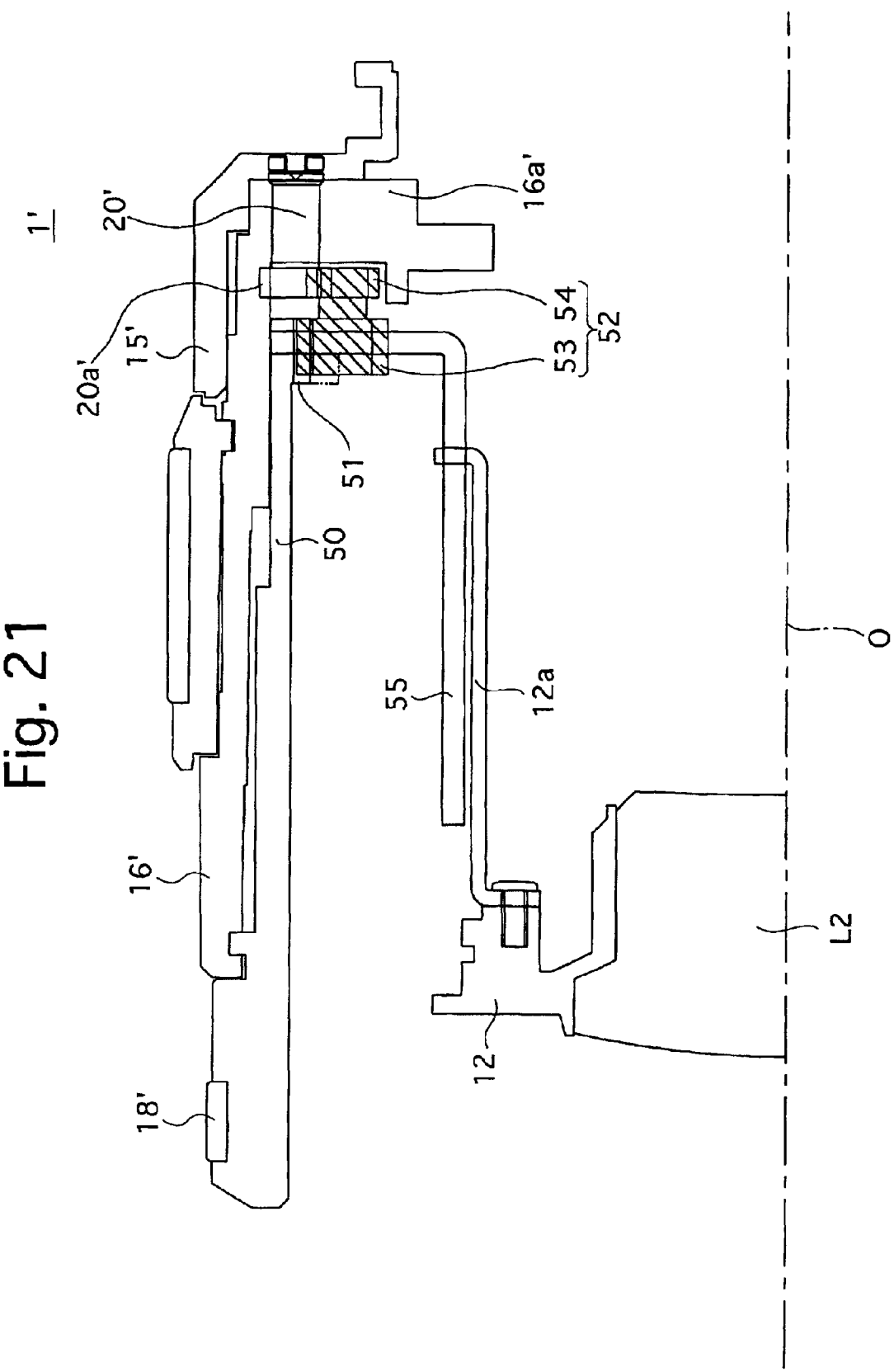
FIG. 21 is an axial cross sectional view of fundamental elements of a focusing lens driving system of a comparative example of a zoom lens barrel which is to be compared with a focusing lens driving system of the zoom lens barrel shown in FIGS. 1 and 2.

In short, a lens barrel 1' shown in FIG. 21 is different from the zoom lens barrel 1 shown in FIGS. 1 and 2 in that the transference of driving force between a hand-operated focusing ring 18' (which corresponds to the focusing ring 18 of the zoom lens barrel 1) and an AF coupler 20' (which corresponds to the AF coupler 20 of the zoom lens barrel 1), which is motor-driven by a motor (not shown) provided in an associated camera body, is accomplished solely via a single relay gear 52 in the lens barrel 1' shown in FIG. 21. In the lens barrel 1', the focusing ring 18' is provided at the rear thereof with a rear ring portion 50 which extends rearward up until the vicinity of an inner flange 16a' formed at the rear end of an outer stationary barrel 16'. The rear ring portion 50 is provided, on an inner peripheral surface at the rear end thereof, with a gear portion 51. The relay gear 52 is provided at front and rear thereof with a front gear portion 53 and a rear gear portion 54, respectively. The gear portion 51 of the rear ring portion 50 meshes with the front gear portion 53 of the relay gear 52, while a gear portion 20a' formed at the front of the AF coupler 20' meshes with the rear gear portion 54 of the relay gear 52. In FIG. 21, the relay gear 52 is diagonally shaded. The focusing ring 18' is provided with an L-shaped drive arm 55 which projects from an inner peripheral surface of the focusing ring 18', in the vicinity of the rear end thereof, at a position different from the position of the gear portion 51 in a circumferential direction about the optical axis of the lens barrel 1'. A front portion of the drive arm 55, which extends parallel to the optical axis of the lens barrel 1', is engaged with a rotational transfer arm 12a fixed to the second lens frame 12 in a movable fashion in the optical axis direction relative to the second lens frame 12. The reason why the present embodiment of the zoom lens barrel 1 shown in FIGS. 1 and 2 can be further miniaturized than the lens barrel 1' shown in FIG. 21 will be hereinafter discussed in detail.

The outer diameter of the lens barrel 1' is greater than the outer diameter of the zoom lens barrel 1 because of the presence of the rear ring portion 50 and the gear portion 51, since a driving force transfer mechanism including the gear portion 51 and the front gear portion 53 of the relay gear 52 takes up a substantial space in a radial direction of the lens barrel 1' because the gear portion 51 and the front gear portion 53 are arranged to mesh with each other in a radial direction of the lens barrel 1'.

Figure 6:
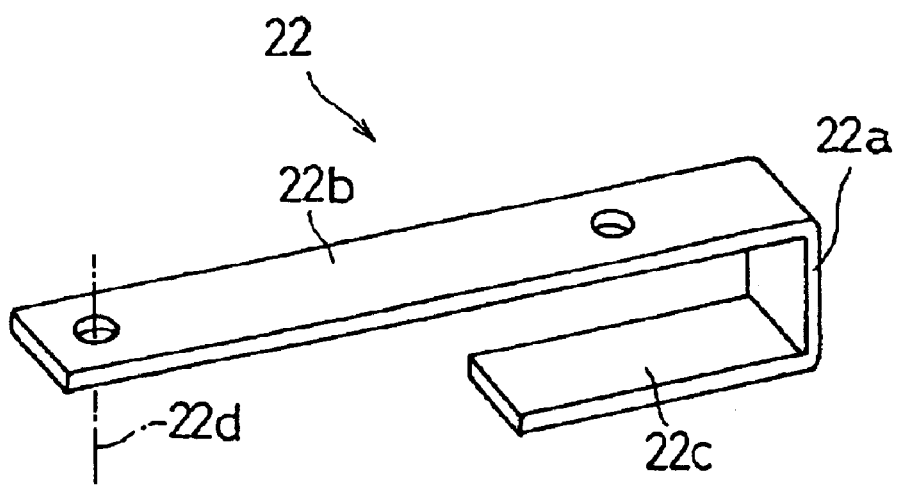
FIG. 6 is a perspective view of a focusing lever provided as an element of the zoom lens barrel shown in FIGS. 1 and 2.

On the other hand, in the zoom lens barrel 1 to which the present invention is applied, not the focusing ring 18 itself but the focusing lever 22 that extends from the focusing ring 18 is engaged with the focusing gear 21, so that it is not necessary to provide the focusing ring 18 with a rear ring portion or a gear portion which corresponds to the rear ring portion 50 and the gear portion 51 of the lens barrel 1'. Accordingly, in the present embodiment of the zoom lens barrel 1, substantial space for a portion of the hand-operated ring (the focusing ring 18) does not have to be provided in the rear portion of the zoom lens barrel 1. As shown in FIG. 6, the focusing lever 22 is narrow member, rather than a space-consuming ring member (such as the rear ring portion 50 shown in FIG. 21), thus contributing to further miniaturization of the zoom lens barrel 1.

The focusing lever 22 and the focusing gear 21 of the zoom lens barrel 1 are integral with each other in a circumferential direction about the optical axis O via the engagement of the radial portion 22a (see FIG. 6) with the radial insertion groove 21d (a radial groove). Therefore, the engagement of the radial portion 22a with the radial insertion groove 21d does not consume a substantial space in a radial direction of the zoom lens barrel 1. In other words, a radial space for connecting the focusing gear 21 and the focusing lever 22 to each other, so that a rotation of one of the focusing gear 21 and the focusing lever 22 is transferred to the other, corresponds to the space for the focusing gear 21 (specifically, for the wall thickness of the focusing gear 21). Specifically, although the outer long arm 22b of the focusing lever 22 is positioned outside the focusing gear 21 in a radial direction of the zoom lens barrel 1, a rotational force can be transferred between the focusing gear 21 and the focusing lever 22 even if the outer long arm 22b and an outer peripheral surface of the focusing gear 21 are positioned to be substantially flush with each other. This makes it possible to miniaturize the structure surrounding the focusing ring 18 even further. Contrary to this structure of the zoom lens barrel 1, in the lens barrel 1' shown in FIG. 21, since the gear portion 51 of the focusing ring 18' needs to be positioned on the front gear portion 53 of the relay gear 52, the focusing ring 18' that includes the rear ring portion 50 cannot be made smaller in diameter to be positioned more inwardly than the position of the focusing ring 18' shown in FIG. 21.

The relay gear 52 shown in FIG. 21 is preferably molded of synthetic resin from a viewpoint of production cost.

However, if the relay gear 52 is molded of synthetic resin, the relay gear 52 cannot be made small in size in both the axial direction and the radial direction of the lens barrel 1' to ensure a sufficient strength of the relay gear 52. Meanwhile, unlike the relay gear 52 shown in FIG. 21, the focusing gear 21 of the present embodiment of the zoom lens barrel 1 is a large-diameter ring, having the center thereof on the optical axis O (see FIG. 4), even though the focusing gear 21 is made of synthetic resin. Therefore, a sufficient strength of the focusing gear 21 is maintained even if the wall thickness of the focusing gear 21 in a radial direction thereof is smaller than the diameter of the relay gear 52. In addition, each of the front gear portion 53 of the relay gear 52 and the gear portion 50 of the focusing ring 18' in the lens barrel 1' needs to be sufficiently long in the optical axis direction, in order to reliably transfer rotation from one of the front gear portion 53 and the gear portion 50 to the other; whereas the radial portion 22a and the radial insertion groove 21d in the present embodiment of the zoom lens barrel 1 are securely engaged with each other due to a sufficient range of engagement thereof in a radial direction of the zoom lens barrel 1. Accordingly, it is sufficient to have that space for the engagement of the radial portion 22a with the radial insertion groove 21d in the optical axis direction, the thickness of which being approximately to the same as the thickness of the focusing lever 22.

As can be understood from the above descriptions, the structure of the engagement of the focusing gear 21 with the focusing lever 22 consumes little space in the zoom lens barrel 1 in radial and optical axis directions, as compared with the structure of the engagement of the relay gear 52 with the gear portion 51 of the focusing ring 18' shown in FIG. 21. For instance, the width of the focusing gear 21 in the optical axis direction can be made smaller than the axial length of the relay gear 52 in the same direction for the purpose of positioning the front end of the focusing gear 21 behind a position corresponding to the position of the front end of the relay gear 52 in the optical axis direction. This enlarges an inner space in the rear portion of the zoom lens barrel 1 in the optical axis direction, which in turn increases the range of movement of one or more movable members such as a cam ring in the optical axis direction within a limited space of the zoom lens barrel 1, or the length of the zoom lens barrel 1 can be shortened. It should be noted that the radial portion 22a of the focusing lever 22 does not interfere with any peripheral elements of the focusing gear 21 since the radial portion 22a is inserted in the radial insertion groove 21d of the focusing gear 21.

In the present embodiment of the zoom lens barrel 1, the structure for supporting the focusing gear 21 in a rotatable fashion about the optical axis O is accomplished by the engagement of the three outer projections 16b with the three arc grooves 21c. Accordingly, this supporting structure is simple, and securely supports the focusing gear 21 in a rotatable fashion about the optical axis O.

As can be understood from the foregoing, in the present embodiment of the zoom lens barrel, the driving force transfer mechanism, which is positioned between the AF coupler 20 and the focusing ring 18, for transferring a driving force generated by an electric drive mechanism including the AF coupler 20 to the second lens group L2, and also for transferring a driving force generated by rotation of the focusing ring 18 to the second lens group L2, is designed so that the focusing lever 22 and the focusing gear 21, which are fundamental elements of the driving force transfer mechanism, are arranged separately, and so that the focusing gear 21 and the focusing ring 18 are linked to each other via the focusing lever 22 to be integral with each other in at least a circumferential direction about the optical axis O so as to be rotatable together about the optical axis O. This makes it possible to miniaturize the focusing lens driving system, which in turn makes it possible to further miniaturize the zoom lens barrel 1.

Although the second lens group L2, which serves as a focusing lens group, moves in the optical axis direction while rotating about the optical axis O when focusing operation is carried out, the focusing lens group can be driven to move in a different manner. For instance, the following structure can be adopted, namely, the zoom lens barrel can be provided with a focusing lens frame which supports the focusing lens group and which is guided linearly in the optical axis direction without rotating about the optical axis, the zoom lens barrel can be provided with a rotating ring for focusing operation which is rotated by a focusing lever, and the rotating ring can support the focusing lens frame via threads or cams for focusing operation.

When the above described driving force transfer mechanism is applied to the focusing lens driving system of a lens barrel as described above, this lens barrel can be modified to be provided as a lens barrel of fixed focal length, not as a zoom lens barrel.

Conversely, the above described driving force transfer mechanism can be applied to not only a focusing lens driving system but also to a zoom lens driving system. For instance, the following structure can be adopted; i.e., the focusing lever 22 can be fixed to the zoom ring 19 instead of the focusing ring 18, and the above described structure of the zoom lens barrel 1 can be modified so that the focusing lever 22 gives a rotational force to the first cam ring 23 instead of the second lens frame 12. According to this modified structure, the zoom lens driving system can attain effects similar to the above described effects of the zoom lens barrel 1. In this case, zooming operation can be carried out by an electric drive mechanism provided in an associated camera body in addition to manually turning the zoom ring 19. This type of zoom lens driving mechanism with which manual zooming and motor-driven zooming operations can be selectively performed is known in the art of SLR cameras. For instance, the following type of zoom lens barrel is known in the art; namely, a zoom lens barrel which is provided with a hand-operated power zoom ring which is movable between two positions: a front position and a rear position in the optical axis direction of the zoom lens barrel. A rotation of the power zoom ring is directly transferred to a zoom lens optical system to perform manual zoom operation if the power zoom ring is manually pulled rearward to the rear position. If the power zoom ring is manually pushed forward to the front position, a forward or reverse rotation of the power zoom ring from a neutral position thereof by a small angle of rotation is sensed via an electric sensor, causing the electric drive mechanism to drive the zoom lens optical system to perform zooming operation.

As can be understood from the foregoing, according to the present invention, simplification, further miniaturization, cost-reduction, and improvement in precision of the mechanism are all achieved in a lens barrel.

Moreover, according to the present invention, in a lens barrel having at least two lens groups which are movable relative to each other, the precision in position of the lens groups and the optical performance thereof are improved.

Furthermore, according to the present invention, in a lens barrel having two lens groups which are movable relative to each other, a compact lens barrel, having a large amount of relative movement between the two lens groups, is achieved.

Furthermore, according to the present invention, in a lens barrel provided with both a hand-operated ring for manually driving one or more movable lens groups and an electric lens driving mechanism for driving the same movable lens group or groups, a lens driving force transfer system associated with the hand-operated ring and the electric lens driving mechanism can be designed compact in order to further miniaturize the lens barrel.

The present invention is not limited solely to the above described particular embodiment. For instance, the lens barrel according to the present invention can be applied to not only SLR cameras, but also any other optical device such as camcorders.

The above-described mechanisms of the zoom lens barrel 1 can be applied to not only a type of lens barrel whose lens system consists of four lens groups (such as the above described zoom lens barrel 1), but also to any other type of lens barrel whose lens system consists of two or more lens groups.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens barrel comprising:
    a stationary barrel;
    first, second, and third lens support rings which are guided in a direction of an optical axis via said stationary barrel; and
    a lens drive ring which is rotated about said optical axis to move each of said first lens support ring, said second lens support ring and said third lens support ring in said optical axis direction;
    wherein said lens drive ring comprises:
        a first extending guide portion which is engaged with a fixed extending guide portion formed on said stationary barrel to move said lens drive ring in said optical axis direction upon said lens drive ring being rotated;
        an engaging portion which is engaged with a guiding portion formed on said first lens support ring, so that said lens drive ring and said first lens support ring are relatively rotatable about said optical axis and integrally movable in said optical axis direction;
        a second extending guide portion, which is engaged with an extending guide portion formed on said second lens support ring, to move said second lens support ring in said optical axis direction relative to said lens drive ring via rotation of said lens drive ring; and
        a third extending guide portion which is engaged with an extending guide portion formed on said third lens support ring to move said third lens support ring in said optical axis direction relative to said lens drive ring by said rotation of said lens drive ring.

2. The lens barrel according to claim 1, wherein said lens drive ring is molded with synthetic resin, and
    wherein said engaging portion of said lens drive ring, said first extending guide portion, said second extending guide portion, and said third extending guide portion, are formed integral with said lens drive ring.

3. The lens barrel according to claim 1, wherein said engaging portion of said lens drive ring, said first extending guide portion, said second extending guide portion, and said third extending guide portion are all formed as projections that project from said lens drive ring.

4. The lens barrel according to claim 1, wherein said second extending guide portion and said third extending guide portion are formed on one and the other of inner and outer peripheral surfaces of said lens drive ring, respectively.

5. The lens barrel according to claim 1, wherein said lens drive ring comprises a rotational transfer recess to receive a driving force by which said lens drive ring rotates.

6. The lens barrel according to claim 1, wherein said stationary barrel comprises a linear guide portion for guiding one of said first lens support ring, and said second and third lens support rings in said optical axis direction; and wherein said first lens support ring comprises linear guide portion for guiding the other of said first lens support ring, and said second and third lens support rings in said optical axis direction.

7. The lens barrel according to claim 1, further comprising:

a rotating ring supported by one of said second lens support ring and said third lens support ring to be rotatable about said optical axis; and a fourth lens support ring which is guided in said optical axis direction without rotating about said optical axis, said fourth lens support ring being moved in said optical axis direction via rotation of said rotating ring;

wherein said lens drive ring includes a lever via which said rotation of said lens drive ring is transferred to said rotating ring.

8. A lens barrel having a first lens group and a second lens group which are movable in a direction of an optical axis relative to each other, said lens barrel comprising:

a first lens support ring which supports said first lens group;

a rotating ring which is supported by said first lens support ring to be rotatable about said optical axis, wherein said rotating ring is rotated about said optical axis;

a second lens support ring which holds said second lens group, and is positioned between an inner peripheral surface of said rotating ring and an outer peripheral surface of said first lens support ring;

a linear guide bottomed groove formed on one of an outer peripheral surface of said first lens support ring and an inner peripheral surface of said second lens support ring to extend parallel to said optical axis;

a linear guide projection formed on the other of said outer peripheral surface of said first lens support ring and said inner peripheral surface of said second lens support ring to be slidably engaged in said linear guide bottomed groove;

a extending guide protrusion formed on one of an inner peripheral surface of said rotating ring and an outer peripheral surface of said second lens support ring; and a follower pin formed on the other of said inner peripheral surface of said rotating ring and said outer peripheral surface of said second lens support ring, said follower pin engaging with said extending guide protrusion;

wherein each of said first lens support ring, said second lens support ring, and said rotating ring is formed as a solid annular member having no radial through holes.

9. The lens barrel according to claim 8, wherein said extending guide protrusion has a rectangular shape in cross section; and wherein said follower pin comprises at least one pair of cylindrical follower pins, each said pair of cylindrical follower pins holding a corresponding said extending guide protrusion therebetween.

10. The lens barrel according to claim 8, wherein said follower pin comes into linear contact with said extending guide protrusion along a line extending substantially in a radial direction of said lens barrel.

11. The lens barrel according to claim 8, wherein each said extending guide protrusion comprises a non-linear contour.

12. The lens barrel according to claim 8, wherein each of said first lens support ring, said second lens support ring, and said rotating ring is molded with synthetic resin.

13. The lens barrel according to claim 8, wherein said extending guide protrusion is formed integral with one of said rotating ring and said second lens support ring, and wherein said follower pin is formed on the other of said rotating ring and said second lens support ring.

14. The lens barrel according to claim 8, wherein said linear guide projection is formed integral with one of said first lens support ring and said second lens support ring.

15. The lens barrel according to claim 8, wherein one of said first lens support ring and said rotating ring comprises a circumferential bottomed groove which extends circumferentially;

wherein said the other of said first lens support ring and said rotating ring comprises a guide projection which is engaged in said circumferential bottomed groove; and wherein said first lens support ring and said rotating ring are coupled to each other to be rotatable relative to each other due to an engagement of said guide projection with said circumferential bottomed groove.

16. The lens barrel according to claim 8, wherein each of said first lens group and said second lens group serves a lens group of a zoom lens system.

17. The lens barrel according to claim 16, further comprising:

a third lens group which differs from said first and second lens groups;

a zoom ring which can be manually rotated;

a cam ring which is rotated by rotation of said zoom ring to move said third lens group in said optical axis direction; and a rotational transfer arm which extends from said rotating ring and is engaged with said cam ring to receive a rotational force from said cam ring;

wherein a rotation of said zoom ring causes said rotating ring to rotate to thereby move said first lens group and second lens group in said optical axis direction relative to each other.

18. A lens barrel having a first lens group and a second lens group which are relatively movable in a direction of the optical axis thereof, said lens barrel comprising:

a stationary barrel;

a drive ring which is supported by said stationary barrel to move in said optical axis direction while rotating about said optical axis relative to said stationary barrel upon being rotated;

a first movable ring which supports said first lens group and is guided along said optical axis, said first movable ring being supported by said drive ring so that said drive ring is rotatable about said optical axis and integrally movable with said first movable ring in said optical axis direction; and a second movable ring which supports said second lens group and is guided in said optical axis direction without rotating about said optical axis, a rotation of said drive ring relative to said second movable ring causing said second movable ring to move in said optical axis direction relative to said drive ring;

wherein said first movable ring moves together with said drive ring in said optical axis direction, and at the same time, said second movable ring concurrently moves in said optical axis direction relative to said drive ring when said drive ring moves in said optical axis direction while rotating about said optical axis.

19. The lens barrel according to claim 18, wherein said first movable ring comprises:

a linear moving ring which is guided in said optical axis direction without rotating about said optical axis, said linear moving ring being supported by said drive ring so as to be relatively rotatable with respect to said drive ring about said optical axis, and to be integrally movable with said drive ring in said optical axis direction; and a lens support ring which supports said first lens group, and is positioned in said linear moving ring to be supported thereby so that said lens support ring can be moved in the optical axis direction with respect to said linear moving ring while rotating about said optical axis relative to said linear moving ring;

wherein when said linear moving ring is moved forward and rearward in the optical axis direction, said lens support ring integrally moves forward and rearward together with said linear moving ring in said optical axis direction; and wherein when said lens support is individually rotated, said lens support ring moves forward and rearward in said optical axis direction relative to said linear moving ring.

20. The lens barrel according to claim 18, wherein said first movable ring is guided by said stationary barrel so as to be movable in said optical axis direction without rotating about said optical axis; and wherein said second movable ring is guided by said first movable ring to be movable in said optical axis direction without rotating about said optical axis.

21. The lens barrel according to claim 20, wherein said stationary barrel comprises a first linear guide portion which extends in said optical axis direction;

wherein said second movable ring comprises a second linear guide portion which extends in said optical axis direction;

wherein said first movable ring comprises:

a first linear guide projection which extends parallel to said optical axis, and is engaged with said first linear guide portion to guide said first movable ring in said optical axis direction without rotating said first movable ring about said optical axis; and a second linear guide projection which extends parallel to said optical axis, and is engaged with said second linear guide portion to guide said second movable ring in said optical axis direction without rotating said second movable ring about said optical axis;

wherein said first linear guide projection and said second linear guide projection are formed on an outer peripheral surface of said first movable ring at the same position in a circumferential direction thereof and at different positions in said optical axis direction.

22. The lens barrel according to claim 18, further comprising:

a rib-shaped extending guide projection formed on one of inner and outer peripheral surfaces of said stationary barrel to extend in a direction inclined with respect to said optical axis; and a follower projection formed on one of inner and outer peripheral surfaces of said drive ring to be engaged with said rib-shaped extending guide projection, said drive ring moving in said optical axis direction while rotating about said optical axis relative to said stationary barrel due to an engagement of said rib-shaped extending guide projection with said follower projection.

23. The lens barrel according to claim 22, further comprising:

a guide projection which projects radially from one of a first peripheral surface of said drive ring and a second peripheral surface of said first movable ring, said first peripheral surface and said second peripheral surface facing each other; and a circumferential groove formed on the other of said first peripheral surface and said second peripheral surface;

wherein said guide projection is engaged in said circumferential groove, whereby said drive ring is rotatable about said optical axis relative to said first movable ring and integrally movable with said first movable ring in said optical axis direction.

24. The lens barrel according to claim 23, further comprising:

a second rib-shaped extending guide projection formed on one of inner and outer peripheral surfaces of said drive ring to extend in a direction inclined with respect to both said optical axis and the direction in which said rib-shaped extending guide projection extends; and a lead groove formed on one of inner and outer peripheral surfaces of said second movable ring;

wherein said second rib-shaped extending guide projection is engaged in said lead groove, whereby said second movable ring moves in said optical axis direction relative to said drive ring when said drive ring is rotated about said optical axis relative to said stationary barrel.

25. A lens barrel comprising:

a stationary barrel;

a drive ring which is supported by said stationary barrel to move in a direction of the optical axis of a lens of said lens barrel, while rotating about said optical axis relative to said stationary barrel when rotated; and a first movable ring which supports a first lens group and is guided along said optical axis, said first movable ring being supported by said drive ring so that said drive ring is rotatable about said optical axis relative to said first movable ring and integrally movable with said first movable ring in said optical axis direction;

wherein said drive ring and said first movable ring move together in said optical axis direction while rotating about said optical axis relative to each other when said drive ring is rotated about said optical axis;

said first movable ring comprising:

a linear moving ring which is guided in said optical axis direction without rotating about said optical axis, said linear moving ring being supported by said drive ring so as to be relatively rotatable with respect to said drive ring about said optical axis, and to be integrally movable with said drive ring in said optical axis direction; and a lens support ring which supports said first lens group, and is positioned in said linear moving ring to be supported thereby so that said lens support ring can be moved in the optical axis direction with respect to said linear moving ring while rotating about said optical axis relative to said linear moving ring;

wherein when said linear moving ring is moved forward and rearward in the optical axis direction, said lens support ring integrally moves forward and rearward together with said linear moving ring in said optical axis direction; and wherein when said lens support ring is individually rotated, said lens support ring moves forward and rearward in said optical axis direction relative to said linear moving ring.

26. The lens barrel according to claim 25, further comprising:

a rib-shaped extending guide projection formed on one of inner and outer peripheral surfaces of said stationary barrel to extend in a direction inclined with respect to said optical axis; and a follower projection formed on one of inner and outer peripheral surfaces of said drive ring to be engaged with said rib-shaped extending guide projection, said drive ring moving in said optical axis direction while rotating about said optical axis relative to said stationary barrel due to an engagement of said rib-shaped extending guide projection with said follower projection.

27. The lens barrel according to claim 25, further comprising:

a guide projection which projects radially from one of a first peripheral surface of said drive ring and a second peripheral surface of said first movable ring, said first peripheral surface and said second peripheral surface facing each other; and a circumferential groove formed on the other of said first peripheral surface and said second peripheral surface;

wherein said guide projection is engaged in said circumferential groove, whereby said drive ring is rotatable about said optical axis relative to said first movable ring and integrally movable with said first movable ring in said optical axis direction.

28. The lens barrel according to claim 25, further comprising:

a second lens group; and a second movable ring which supports said second lens group, and is guided in said optical axis direction without rotating about said optical axis;

wherein said first movable ring holds said first lens group; and wherein said second movable ring moves in said optical axis direction relative to said drive ring when said drive ring rotates about said optical axis relative to said stationary barrel.

29. The lens barrel according to claim 28, further comprising:

a second rib-shaped extending guide projection formed on one of inner and outer peripheral surfaces of said drive ring to extend in a direction inclined with respect to both said optical axis and the direction in which said rib-shaped extending guide projection extends; and a lead groove formed on one of inner and outer peripheral surfaces of said second movable ring;

wherein said second rib-shaped extending guide projection is engaged in said lead groove, whereby said second movable ring moves in said optical axis direction relative to said drive ring when said drive ring is rotated about said optical axis relative to said stationary barrel.

30. The lens barrel according to claim 28, wherein said first movable ring is guided by said stationary barrel to be movable in said optical axis direction without rotating about said optical axis; and wherein said second movable ring is guided by said first movable ring to be movable in said optical axis direction without rotating about said optical axis.

31. The lens barrel according to claim 30, wherein said stationary barrel comprises a first linear guide portion which extends in said optical axis direction;

wherein said second movable ring comprises a second linear guide portion which extends in said optical axis direction;

wherein said first movable ring comprises:

a first linear guide projection which extends parallel to said optical axis and is engaged with said first linear guide portion to guide said first movable ring in said optical axis direction without rotating said first movable ring about said optical axis; and a second linear guide projection which extends parallel to said optical axis, and is engaged with said second linear guide portion to guide said second movable ring in said optical axis direction without rotating said second movable ring about said optical axis;

wherein said first linear guide projection and said second linear guide projection are formed on an outer peripheral surface of said first movable ring at the same position in a circumferential direction thereof, at different positions in said optical axis direction.

32. A lens barrel comprising:

a stationary barrel;

a drive ring which is supported by said stationary barrel to move in a direction of an optical axis while rotating about said optical axis relative to said stationary barrel when said drive ring is rotated; and a first movable ring which supports a first lens group and is guided in said optical axis direction without rotating about said optical axis, a rotation of said drive ring relative to said first movable ring causing said first movable ring to move in said optical axis direction relative to said drive ring;

wherein said first movable ring moves in said optical axis direction relative to said drive ring when said drive ring moves in said optical axis direction while being rotated about said optical axis.

33. The lens barrel according to claim 32, further comprising:

a rib-shaped extending guide projection formed on one of inner and outer peripheral surfaces of said stationary barrel to extend in a direction inclined with respect to said optical axis; and a follower projection formed on one of inner and outer peripheral surfaces of said drive ring to be engaged with said rib-shaped extending guide projection, said drive ring moving in said optical axis direction while rotating about said optical axis relative to said stationary barrel due to an engagement of said rib-shaped extending guide projection with said follower projection.

34. The lens barrel according to claim 32, further comprising:

a second rib-shaped extending guide projection formed on one of inner and outer peripheral surfaces of said drive ring to extend in a direction inclined with respect to both said optical axis and the direction in which said rib-shaped extending guide projection extends; and a lead groove formed on one of inner and outer peripheral surfaces of said first movable ring;

wherein said second rib-shaped extending guide projection is engaged in said lead groove, whereby said first movable ring moves in said optical axis direction relative to said drive ring when said drive ring is rotated about said optical axis relative to said stationary barrel.

35. The lens barrel according to claim 32, further comprising:

a second lens group; and a second movable ring which supports said second lens group and is guided in said optical axis direction;

wherein said first movable ring supports said first lens group; and wherein said second movable ring is supported by said drive ring so that said drive ring is rotatable about said optical axis relative to said second movable ring and integrally movable with said second movable ring in said optical axis direction.

36. The lens barrel according to claim 35, further comprising:

a guide projection which projects radially from one of a first peripheral surface of said drive ring and a second peripheral surface of said second movable ring, said first peripheral surface and said second peripheral surface facing each other; and a circumferential groove formed on the other of said first peripheral surface and said second peripheral surface;

wherein said guide projection is engaged in said circumferential groove, whereby said drive ring is rotatable about said optical axis relative to said second movable ring and integrally movable with said second movable ring in said optical axis direction.

37. The lens barrel according to claim 35, wherein said second movable ring is guided by said stationary barrel to be movable in said optical axis direction without rotating about said optical axis; and wherein said first movable ring is guided by said second movable ring to be movable in said optical axis direction without rotating about said optical axis.

38. The lens barrel according to claim 37, wherein said stationary barrel comprises a first linear guide portion which extends in said optical axis direction;

wherein said first movable ring comprises a second linear guide portion which extends in said optical axis direction;

wherein said second movable ring comprises:

a first linear guide projection which extends parallel to said optical axis and is engaged with said first linear guide portion to guide said second movable ring in said optical axis direction without rotating said second movable ring about said optical axis; and a second linear guide projection which extends parallel to said optical axis and is engaged with said second linear guide portion to guide said first movable ring in said optical axis direction without rotating said first movable ring about said optical axis;

wherein said first linear guide projection and said second linear guide projection are formed on an outer peripheral surface of said second movable rings at the same position in a circumferential direction thereof at different positions in said optical axis direction.

39. The lens barrel according to claim 32, wherein said second movable ring comprises:

a linear moving ring which is guided in said optical axis direction without rotating about said optical axis, said linear moving ring being supported by said drive ring so as to be relatively rotatable with respect to said drive ring about said optical axis, and to be integrally movable with said drive ring in said optical axis direction; and a lens support ring which supports said second lens group, and is positioned in said linear moving ring to be supported thereby so that said lens support ring can be moved in the optical axis direction with respect to said linear moving ring while rotating about said optical axis relative to said linear moving ring;

wherein when said linear moving ring is moved forward and rearward in the optical axis direction, said lens support ring integrally moves forward and rearward together with said linear moving ring in said optical axis direction; and wherein when said lens support is individually rotated, said lens support ring moves forward and rearward in said optical axis direction relative to said linear moving ring.

40. A lens barrel comprising:

a stationary barrel;

a hand-operated ring supported by said stationary barrel to be manually rotated;

a lens group which is movable in a direction of the optical axis thereof;

a lever which is fixed, at one end thereof, to an inner peripheral surface of said hand-operated ring, and wherein the other end of said lever is associated with said lens group, wherein a rotation of said hand-operated ring causes said lens group to move in said optical axis direction via said lever;

a driving gear; and an annular gear, provided independently of said hand-operated ring, which meshes with said driving gear, the center of said annular gear being positioned on said optical axis;

wherein said annular gear is supported by said stationary barrel to be rotatable about said optical axis relative to said stationary barrel; and wherein said annular gear and said hand-operated ring are engaged with each other so as to move integrally in a circumferential direction of said lens barrel via said lever.

41. The lens barrel according to claim 40, wherein said annular gear comprises a radial bottomed groove which is formed on a front surface of said annular gear to extend in a radial direction of said lens barrel, said front surface facing forward of said optical axis direction; and wherein said lever includes a radial portion which is engaged in said radial bottomed groove to be immovable in said circumferential direction relative to said radial bottomed groove.

42. The lens barrel according to claim 41, wherein said lever comprises a pair of parallel arms which extend forward from said radial portion of said lever at different radial positions thereat;

wherein one of said pair of parallel arms is fixed to said hand-operated ring; and wherein the other of said pair of parallel arms is connected to a lens supporting member, which supports said lens group, whereby said hand-operated ring is integrally movable with said lens supporting member in a circumferential direction.

43. The lens barrel according to claim 40, wherein said stationary barrel comprises a set of projections at different positions on said stationary barrel in a circumferential direction about said optical axis; and wherein said annular gear comprises a corresponding set of circumferential grooves, in which said set of projections are respectively engaged, whereby said annular gear is rotatably supported by said stationary barrel.

44. The lens barrel according to claim 40, wherein said annular gear is molded with synthetic resin.

45. The lens barrel according to claim 40, wherein said lens barrel can be mounted to, and dismounted from, a camera body, said camera body comprising a second driving gear which gives rotation to said driving gear.

46. The lens barrel according to claim 40, wherein said lens group serves as a focusing lens group, said rotation of said hand-operated ring causing said focusing lens group to move in said optical axis direction via said lever to perform a focusing operation.

47. The lens barrel according to claim 46, wherein said lens barrel constitutes a zoom lens barrel, said lens group also serving as a lens group of a zoom lens system, wherein said lens barrel further comprises:

a linear moving ring which is guided in said optical axis direction without rotating about said optical axis, said linear moving ring being moved when a zooming operation is performed; and a lens support ring which supports said focusing lens group, and is positioned in said linear moving ring to be supported thereby, so that said lens support ring can be moved in the optical axis direction with respect to said linear moving ring while rotating about said optical axis relative to said linear moving ring;

wherein said rotation of said hand-operated ring is transferred to said lens support ring via said lever; and wherein said lens support ring moves forward and rearward in said optical axis direction relative to said linear moving ring when rotated forwardly and reversely via said lever, respectively.

48. The lens barrel according to claim 40, wherein said lens barrel serves as a zoom lens barrel, said lens group comprising a plurality of movable lens groups serving as a zoom lens system, said rotation of said hand-operated ring causing said plurality of movable lens groups to move in said optical axis direction to vary a focal length.

* * * * *